US010110787B2

(12) United States Patent
Choi et al.

(10) Patent No.: US 10,110,787 B2
(45) Date of Patent: Oct. 23, 2018

(54) WEARABLE VIDEO DEVICE AND VIDEO SYSTEM INCLUDING THE SAME

(71) Applicant: Samsung Electronics Co., Ltd., Suwon-si, Gyeonggi-do (KR)

(72) Inventors: Yong-jin Choi, Seoul (KR); Sun Min Park, Seoul (KR); Hee-Seok Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 679 days.

(21) Appl. No.: 14/142,233

(22) Filed: Dec. 27, 2013

(65) Prior Publication Data

US 2014/0184801 A1   Jul. 3, 2014

(30) Foreign Application Priority Data

Jan. 2, 2013   (KR) ................ 10-2013-0000360

(51) Int. Cl.
*H04N 5/225*   (2006.01)
*G06K 9/32*   (2006.01)
(Continued)

(52) U.S. Cl.
CPC ......... *H04N 5/2252* (2013.01); *G06K 9/3233* (2013.01); *H04N 5/2258* (2013.01);
(Continued)

(58) Field of Classification Search
CPC ...... H04N 5/02; H04N 5/2252; H04N 5/2258; H04N 5/23203; H04N 5/23238; H04N 7/185; G06K 9/3233
(Continued)

(56) References Cited

U.S. PATENT DOCUMENTS 8,106,939 B2 * 1/2012 Toriumi ................. G06T 7/004
   348/39
8,872,910 B1 * 10/2014 Vaziri .................... G02C 11/10
   348/77

(Continued)

FOREIGN PATENT DOCUMENTS

JP   2005-217921 A   8/2005
KR   2002-0067411 A   8/2002

*Primary Examiner* — Anand S Rao
*Assistant Examiner* — Joseph W Becker
(74) *Attorney, Agent, or Firm* — Jefferson IP Law, LLP

(57) ABSTRACT

A wearable video device is provided. The video device wearable includes a first hanger and a second hanger by which the wearable video device is connected to a user, a first camera module that is installed in the first hanger, the first camera module having a first optical axis that is rotated outward at a predetermined first angle from a central axis of the wearable video device, and the first camera module being configured to generate a first image, a second camera module that is installed in the second hanger, the second camera module having a second optical axis that is rotated outward at a predetermined second angle from the central axis of the wearable video device, and the second camera module being configured to generate a second image, and a main circuit that controls the first camera module and the second camera module, and that processes at least a portion of the first and second images, wherein a first view of the first camera module and a second view of the second camera module partially overlap.

12 Claims, 14 Drawing Sheets

(51) Int. Cl.
*H04N 7/18* (2006.01)
*H04N 5/232* (2006.01)
*H04R 5/033* (2006.01)

(52) U.S. Cl.
CPC ..... *H04N 5/23203* (2013.01); *H04N 5/23238* (2013.01); *H04N 7/185* (2013.01); *H04R 5/033* (2013.01); *H04R 2201/107* (2013.01)

(58) Field of Classification Search
USPC ........................................................ 348/158
See application file for complete search history.

(56) References Cited

U.S. PATENT DOCUMENTS

| | | | |
|---|---|---|---|
| 2002/0015536 A1* | 2/2002 | Warren | G06T 5/50 382/284 |
| 2004/0201695 A1 | 10/2004 | Inasaka | |
| 2008/0266448 A1* | 10/2008 | Reiner | H04N 5/2251 348/376 |
| 2012/0280824 A1* | 11/2012 | Zelepugas | H04R 1/1041 340/670 |
| 2013/0335573 A1* | 12/2013 | Forutanpour | G06F 3/011 348/158 |

* cited by examiner

WEARABLE VIDEO DEVICE AND VIDEO SYSTEM INCLUDING THE SAME

CROSS-REFERENCE TO RELATED APPLICATION(S)

This application claims the benefit under 35 U.S.C. § 119(a) of a Korean patent application filed on Jan. 2, 2013 in the Korean Intellectual Property Office and assigned Serial number 10-2013-0000360, the entire disclosure of which is hereby incorporated by reference.

TECHNICAL FIELD

The present disclosure relates to a video device. More particularly, the present disclosure relates to a wearable video device that is wearable by a user.

BACKGROUND

A wearable video device is used for providing an image captured by a camera through a "see-what-I-see" view.

According to the related art, the wearable video device in a form of a headphone is formed to be worn on one of the ears of a user. In the wearable video device having the above structure, a view of a camera is blocked by a face of the user and thus, the camera needs to be protruded up to a position near eyes of the user to provide the "see-what-I-see" view. Therefore, a size of the camera becomes large. When the size of the camera becomes large, there is difficulty in fixing the camera when the wearable video device is worn on the ear of the user. Therefore, a position of the camera may be readily changed by a movement of the user and providing the "see-what-I-see" view is difficult.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a video device that is easily worn by a user, and provides a "see-what-I-see" view.

In accordance with another aspect of the present disclosure, a wearable video device is provided. The device includes a first hanger and a second hanger by which the wearable video device is connected to a user, a first camera module that is installed in the first hanger, the first camera module having a first optical axis that is rotated outward at a predetermined first angle from a central axis of the wearable video device, and the first camera module being configured to generate a first image, a second camera module that is installed in the second hanger, the second camera module having a second optical axis that is rotated outward at a predetermined second angle from the central axis of the wearable video device, and the second camera module being configured to generate a second image, and a main circuit that controls the first camera module and the second camera modules, and that processes at least a portion of the first and second images, wherein a first view of the first camera module and a second view of the second camera module partially overlap.

In accordance with another aspect of the present disclosure, a video system is provided. The video system includes a wearable video device comprising: a first hanger and a second hanger by which the wearable video device is connected to a user, a first camera module that is installed in the first hanger, the first camera module having a first optical axis that is rotated outward at a predetermined first angle from a central axis of the wearable video device, and the first camera module being configured to generate a first image, a second camera module that is installed in the second hanger, the second camera module having a second optical axis that is rotated outward at a predetermined second angle from the central axis of the wearable video device, and the second camera module being configured to generate a second image, and a main circuit that controls the first camera module and the second camera module, and that processes at least a portion of the first and second images, wherein a first view of the first camera module and a second view of the second camera module partially overlap; and a display unit that displays the at least a portion of the first and second images, and information associated with an object included in the first image and the second image.

In accordance with another aspect of the present disclosure, a method of capturing an image using a wearable video device is provided. The method includes capturing a first image using a first camera module having a first optical axis that is rotated outward at a predetermined first angle from a central axis of the wearable video device, capturing a second image using a second camera module having a second optical axis that is rotated outward at a predetermined second angle from the central axis of the wearable video, and determining a field of interest corresponding to an area of the first image that overlaps with an area of the second image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
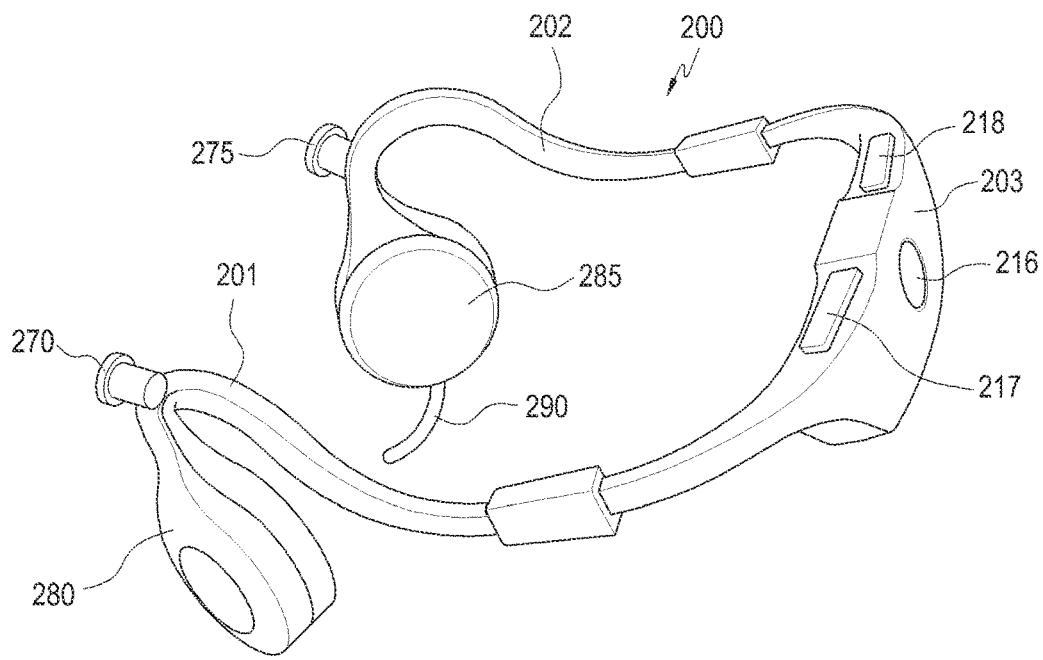
FIG. 1 is a perspective view of a wearable video device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although terms including ordinal numbers, such as "first" and "second," and the like, may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items.

In the case in which a component is referred to as being "connected" or "accessed" to other component, it should be understood that not only the component is directly connected or accessed to the other component, but also there may exist another component between the components. Meanwhile, in the case in which a component is referred to as being "directly connected" or "directly accessed" to other component, it should be understood that there is no component therebetween.

The terms used in this application is for the purpose of describing particular various embodiments only and is not intended to be limiting of the disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk ("DVD") player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography ("CT") device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is a perspective view of a wearable video device according to an embodiment of the present disclosure.

Referring to FIG. 1, a wearable video device 200 generally has an appearance of a headset or a headphone, and includes a first speaker 280 and a second speaker 285 provided to respectively correspond to a left ear and a right ear of a user, a first hanger 201 and a second hanger 202 which are extended from the first speaker 280 and the second speaker 285 and are fixed by being hung on the left ear and the right ear of the user, a housing 203 that is connected with the first hanger 201 and the second hanger 202 and contains a main circuit 205, a first camera module 270 and a second camera module 275 that are installed in the first hanger 201 and the second hanger 202, and the main circuit 205 that is contained in the housing 203. The left ear and the right ear may be referred to as a first ear and a second ear. The housing 203 may be used as a common name of an overall case forming an exterior of a video device.

The first camera module 270 and the second camera module 275 are installed in an outer surface of the first hanger 201 and the second hanger 202.

A plurality of buttons 216, 217, and 218 are disposed on an outer surface of the housing 203.

According to various embodiments of the present disclosure, the wearable device 200 may also include a first microphone 290. According to various embodiments of the present disclosure, input commands may be input by the first microphone 290.

Figure 2:
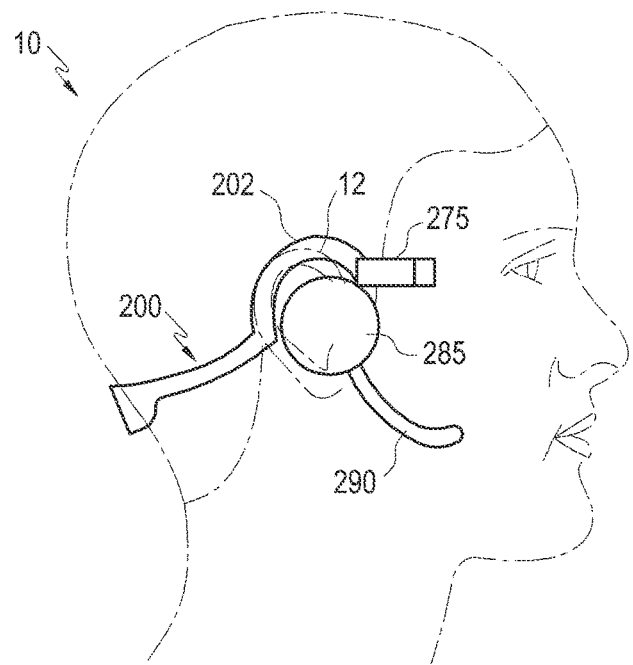
FIG. 2 is a diagram illustrating a right side of a user who wears a wearable video device according to an embodiment of the present disclosure.
Figure 3:
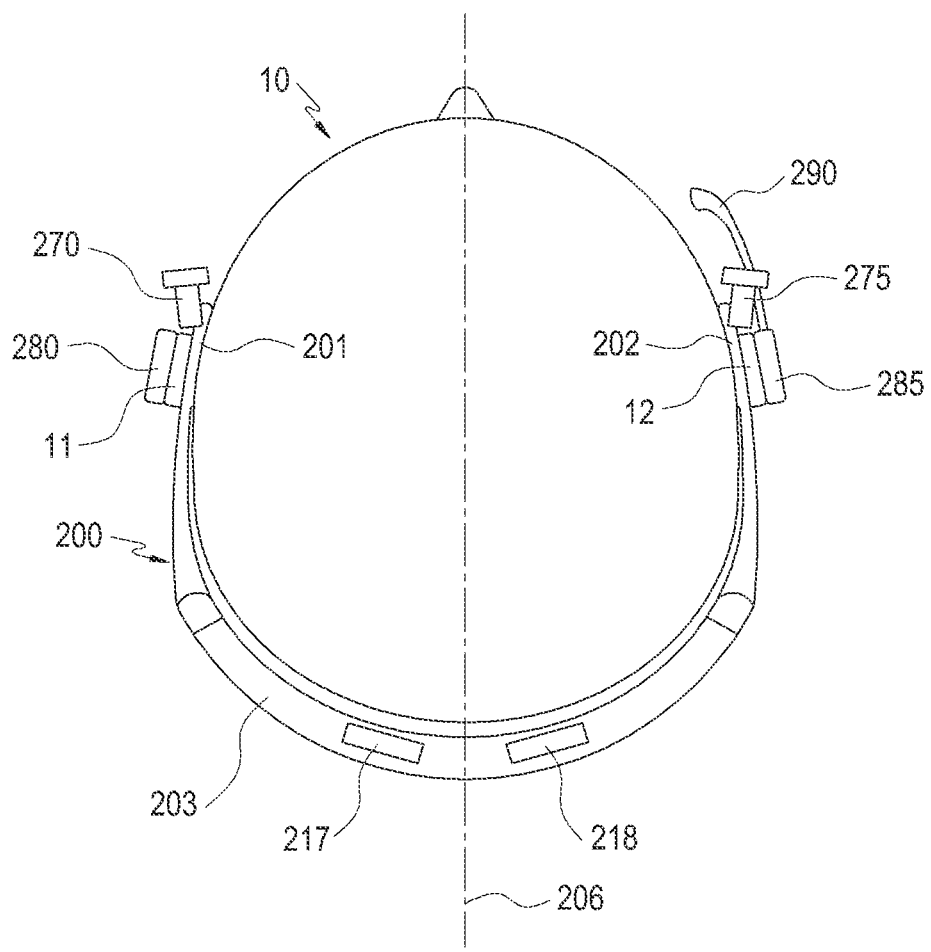
FIG. 3 is a diagram illustrating a top of a head of a user who wears a wearable video device according to an embodiment of the present disclosure.

FIG. 2 illustrates a right side of a user who wears a wearable video device according to an embodiment of the present disclosure, and FIG. 3 illustrates a top of a head of a user who wears a wearable video device according to an embodiment of the present disclosure.

Referring to FIGS. 2 and 3, the first hanger 201 is fixed by being hung on a left ear 11 of a user 10, and the first speaker 280 covers the left ear 11 of the user 10. The second hanger 202 is fixed by being hung on a right ear 12 of the user 10, and the second speaker 285 covers the right ear 12 of the user 10.

According to various embodiments of the present disclosure, a front end of each of the first camera module 270 and the second camera module 275 is disposed a first distance ahead of a corresponding ear, and each of the first camera module 270 and the second camera module 275 is disposed a second distance behind from a front side of a face. For example, the first distance is approximately 1 cm, and the second distance is approximately 5 cm.

The first camera module 270 and the second camera module 275 respectively have first and second optical axes, and the first optical axis and the second optical axis are respectively rotated outward at a first angle and a second angle from a central axis 206 of the wearable video device 200. According to various embodiments of the present disclosure, the first angle and the second angle are substantially identical. However, according to various embodiments of the present disclosure, the first angle and the second angle may be different from each other in a wearable video device according to various structures of the wearable video device 200. For example, each of the first optical axis and the second optical axis may be rotated outward from 10 to 40 degrees from the central axis 206 of the wearable video device 200. Therefore, the first optical axis and the second optical axis may form an angle of 20 to 80 degrees. According to various embodiments of the present disclosure, each of the first optical axis and the second optical axis may be rotated outward at 23 to 33 degrees from the central axis of the wearable video device 200.

The central axis 206 may be regarded as an axis of substantial bilateral symmetry of the wearable video device 200, and the central axis 206 may be midway between the first speaker 280 and the second speaker 285.

Figure 4:
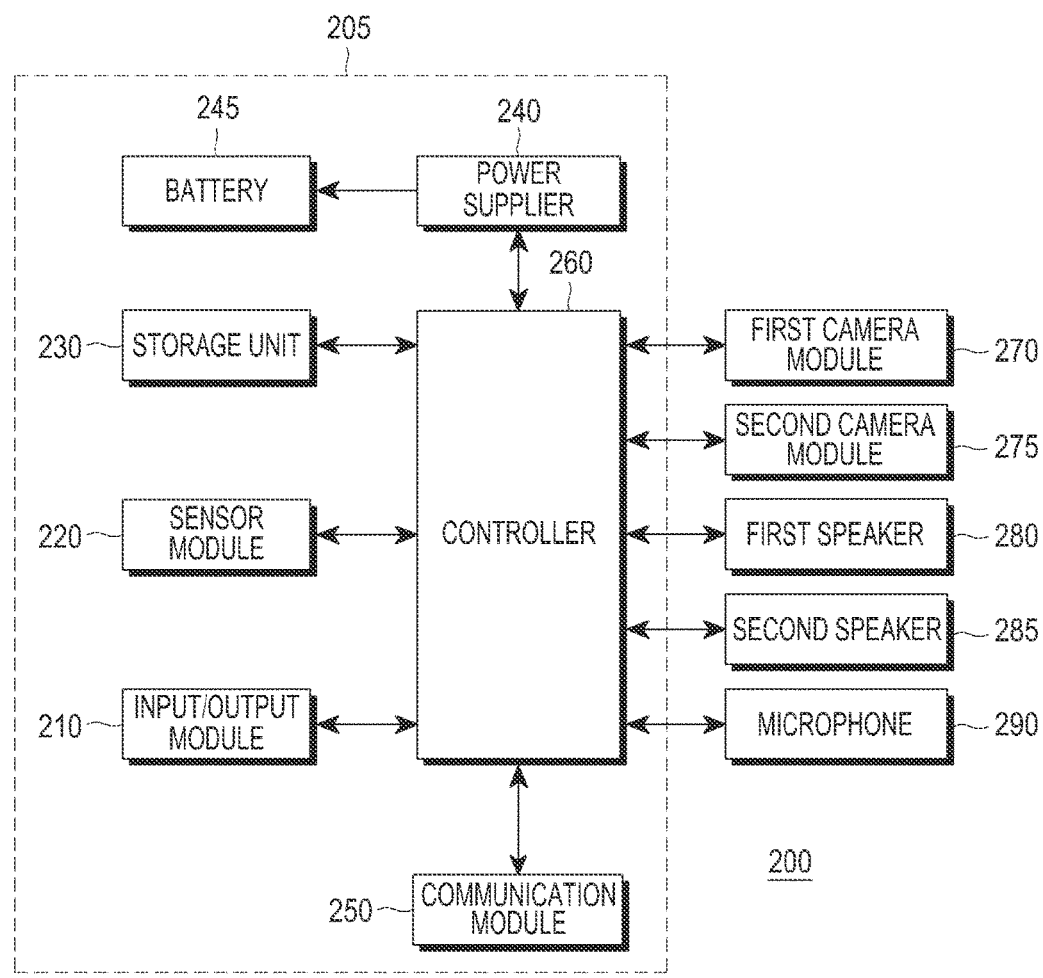
FIG. 4 is a diagram illustrating a configuration of a circuit of a wearable video device according to an embodiment of the present disclosure.

FIG. 4 is a diagram illustrating a configuration of a circuit of a wearable video device according to an embodiment of the present disclosure.

Referring to FIG. 4, the wearable video device 200 includes a first input/output module 210, a first sensor module 220, a first storage unit 230, a first power supplier 240, a first battery 245, a first communication module 250, a first controller 260, the first camera module 270, the second camera module 275, the first speaker 280 and the second speaker 285, a first microphone 290.

Each of the first speaker 280 and the second speaker 285 outputs, to the external environment of the wearable video device 200 (e.g., to the user), a sound corresponding to various data (e.g, wireless data, broadcasting data, a digital audio file, a guidance voice, and the like) based on a control of the first controller 260. Each of the first speaker 280 and the second speaker 285 may output a sound corresponding to a function that the wearable video device 200 performs.

The first microphone 290 receives a voice or sound from the outside of the video device 200 to generate electric sound data, and output the generated sound data to the first controller 260. One or a plurality of first microphones 290 may be disposed on a proper position or positions of the wearable video device 200. According to various embodiments of the present disclosure, a single first microphone 290 is extended from the second speaker 285. According to various embodiments of the present disclosure, the first microphone 290 may be included in the first input/output module 210.

The first input/output module 210 is a means that receives user input information, informs a user of information, receives data from the external environment, and outputs data to the outside, and may include at least one button, a connector, a keypad, or a combination thereof. The first input/output module 210 may be disposed, on an outer surface of the housing 203, the first hanger, 201, the second hanger 202, the first speaker 280, and/or the second speaker 285.

The at least one button of the first input/output module 210 is provided to receive a user input, and one or a plurality of buttons may be disposed on a proper position or positions of the wearable video device 200. According to various embodiments of the present disclosure, the power button 216 that powers on or off the wearable video device 200, the volume adjusting button 217 that turns up and down a volume, and the search button 218 that selects a previous item or a next item, or quickly plays back or reversely plays back an item (e.g., a next button, a previous button, a fast forward button, a rewind button, and the like) may be disposed on an outer surface of the housing 203.

The connector may be used as an interface for connecting the wearable video device 200 to an external electronic device, a power source, and/or the like. The connector may be connected to a connector of the electronic device, directly or through a wired cable. Through the connector connection, the first controller 260 may transmit data stored in the first storage unit 230 to the electronic device or may receive data from the electronic device. In addition, the wearable video device 200 may receive power from a power source through the wired cable connected to the connector, and may charge the first battery 245.

The keypad may receive, from a user, a key input for controlling the wearable video device 200. The keypad may be disposed on an outer surface of the housing 203, the first hanger 201, the second hanger 202, the first speaker 280, second speaker 285, and/or the like.

The first sensor module 220 includes at least one sensor that detects a state of the wearable video device 200, a state of an ambient environment, a state of the user, and/or the like. For example, the first sensor module 220 may include a proximity sensor that detects whether a user wears the wearable video device 200, a motion/point of compass sensor that detects a motion (e.g., rotation, acceleration, deceleration, vibration and the like of the wearable video device 200) or a position (or an orientation) of the wearable video device 200, an illumination sensor that detects an ambient illumination, and/or the like, or a combination thereof. According to various embodiments of the present disclosure, a motion/point of compass sensor may include, for example, an acceleration sensor, a gravity sensor, a terrestrial magnetism sensor, a gyro sensor, an impact sensor, a Global Positioning System (GPS) sensor, a compass sensor, and/or the like.

The first power supplier 240 may supply power to the wearable video device 200 based on a control of the first controller 260. The first power supplier 240 may be connected to one or a plurality of first batteries 245. According to various embodiments of the present disclosure, the first power supplier 240 may supply power, to the wearable video device 200, input from an external power source (not illustrated) through a wired cable connected to the connector.

The first communication module 250 may be a wired, wireless, or wired/wireless communication module. The first communication module 250 may wiredly or wirelessly transmit data from the first controller 260 to an electronic device, or may wiredly or wirelessly receive data from an electronic device so as to transfer the same to the first controller 260.

The first communication module 250 may wirelessly communicate with an external electronic device based on a control of the first controller 260. A communication scheme may correspond to a short distance communication scheme such as Bluetooth, an Infrared Data Association (IrDA) communication, a WiFi-Direct communication, a Near Field Communication (NFC), and/or the like.

Each of the first camera module 270 and the second camera module 275 includes a lens system and an image sensor, and may further include a flash, and/or the like. Each of the first camera module 270 and the second camera module 275 converts an optical image of a subject formed by the lens system into electric image data through an image sensor, and outputs the electric image data to the first controller 260. The first controller 260 processes a part or an entirety of the first and/or second image data input from the first camera module 270 and the second camera module 275. The first controller 260 may transmit the part or entirety of the first and/or second image data to an external electronic device through the first communication module 250. In the present disclosure, an image may be used as an identical meaning as image data.

The first controller 260 processes the first and/or second image data input from the first camera module 270 and the second camera module 275 based on a frame unit, stores the processed first and/or second image data in the storage unit 230, and transmits a part or an entirety of the processed first and/or second image data to an external electronic device through the first communication module 250.

The first controller 260 performs a programmed operation based on user input information input through the first input/output module 210. The first controller 260 may include a bus for information communication and a processor that is connected with the bus for processing information. The first controller 260 may also include a memory (e.g., a Random Access Memory (RAM)) that is connected with the bus for storing information required by the processor. The memory may be used for storing temporary information required by the processor. The first controller 260 may further include a Read Only Memory (ROM) that is connected with the bus for storing static information required by the processor. The first controller 260, as a central processing device, may control general operations of the wearable video device 200. The first storage unit 230 stores first and second image data input from the first camera module 270 and the second camera module 275 or the first controller 260, and may store an operating program required for driving the wearable video device 200.

The first storage unit 230 is a machine-readable (e.g., a computer-readable, a portable phone-readable, and the like) medium, and the term, "machine-readable medium" may be defined as a medium that provides data to a machine so that the machine executes a predetermined function. The machine-readable medium may be a storage medium. The first storage unit 230 may include a non-volatile medium and a volatile medium. All of these media may need to be a type that allows commands transferred by the media to be detected by a physical instrument through which the machine reads the commands. The first storage unit 230 may be a non-transitory machine-readable storage medium.

The non-transitory computer readable storage medium includes, but is not limited to, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), a Flash-EPROM, and the like.

According to various embodiments of the present disclosure, the wearable video device 200 may be used to capture an ambient view that a user currently views, and to obtain positional information and/or an image of a view area of interest from the captured ambient view image. According to various embodiments of the present disclosure, the wearable video device 200 may be used to obtain positional information and/or an image of a view area of uninterest from the captured ambient view image.

According to various embodiments of the present disclosure, the first camera module 270 and the second camera module 275 have an identical configuration. Hereinafter, a configuration of the first camera module 270 will be described.

Figure 5:
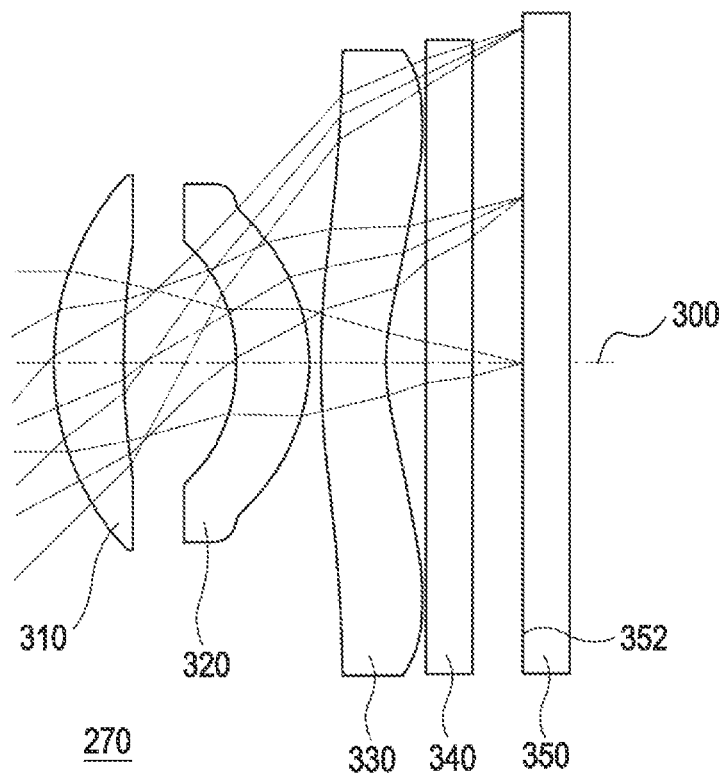
FIG. 5 is a diagram illustrating a first camera module according to an embodiment of the present disclosure.

FIG. 5 is a diagram illustrating a first camera module according to an embodiment of the present disclosure.

Referring to FIG. 5, the first camera module 270 includes a lens system. The lens system comprises a first lens 310, a second lens 320, a third lens 330, an Infrared (IR) filter 340, and an image sensor 350, and/or the like aligned on an optical axis 300. Generally, an optical axis refers to an axis that does not change optical performance of an optical device although the optical device rotates about the axis. Aligning on an optical axis indicates that a center of curvature of a corresponding optical device is located on the optical axis or a symmetrical point (e.g., a center of symmetry) or a central point of the corresponding optical device is located on the optical axis.

According to various embodiments of the present disclosure, each of the first lens 310, the second lens 320, and the third lens 330 performs a function of refracting an incident light, and the first lens 310, the second lens 320, and the third lens 330 form an image of a subject located within an angle of view of each lens on a top surface 352 of the image sensor 350. According to various embodiments of the present disclosure, the IR filter 340 blocks infrared rays that pass through the first lens 310, the second lens 320, and third lens 330. According to various embodiments of the present disclosure, the image sensor 350 converts an optical image formed by a light that passes the IR filter 340 into electric image data.

According to various embodiments of the present disclosure, the image sensor 350 includes a plurality of pixel units arranged in an M×N matrix structure and each of the pixel units may include a photodiode and a plurality of transistors. The pixel units accumulate electric charges generated by the incident light and the voltage induced by the accumulated electric charges indicates the intensity of illumination of the incident light. When an image forming a still image or a video is processed, image data output from the image sensor 350 may be formed of a set of voltages (e.g., pixel values) output from pixels units, and the image data indicates a single frame (e.g., a still image). According to various embodiments of the present disclosure, the frame is formed of M×N pixels.

As described above, each of the first and second axes of the first camera module 270 and the second camera module 275 is rotated outward at a predetermined angle from the central axis 206 of the wearable video device 200.

Figure 6:
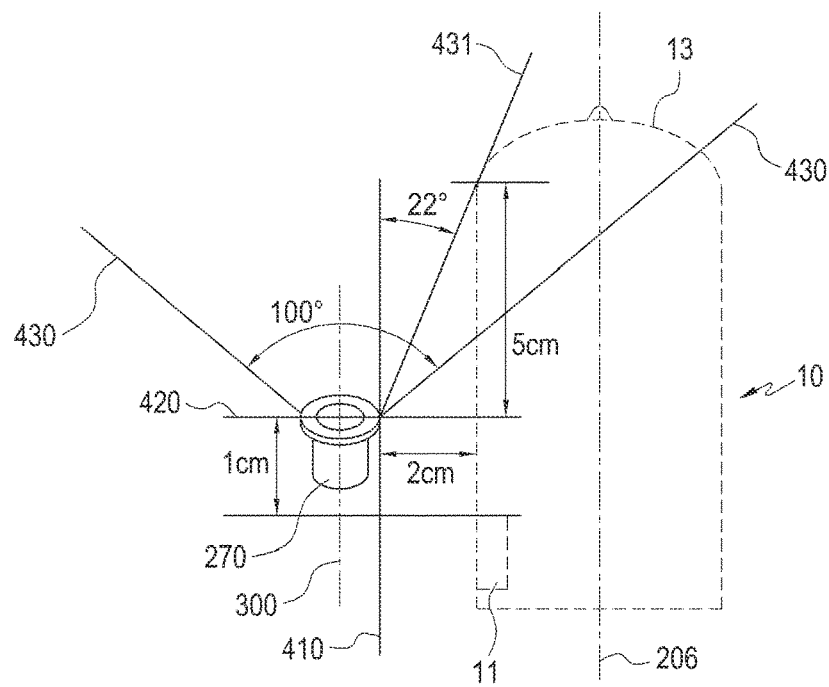
FIGS. 6 and 7 are diagrams illustrating rotation of an optical axis of a first camera module according to an embodiment of the present disclosure.
Figure 7:
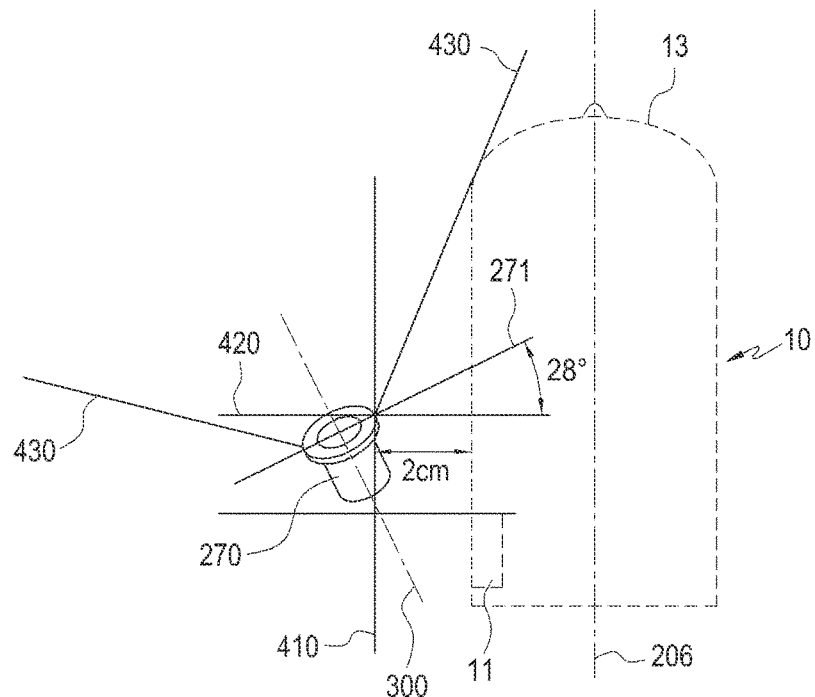

FIGS. 6 and 7 are diagrams illustrating rotation of an optical axis of a first camera module according to an embodiment of the present disclosure.

Referring to FIGS. 6 and 7, the top of the head of the user 10 who wears the wearable video device 200 is illustrated. FIGS. 6 and 7 illustrate only the first camera module 270 of the wearable video device 200.

FIG. 6 illustrates a case in which the first axis 300 of the first camera module 270 is not rotated.

The first camera module 270 has an angle of view of 100 degrees, and a front end of the first camera module 270 is perpendicular to the first optical axis 300. The first optical axis 300 of the first camera module 270 is parallel with a first reference axis 410 that is parallel with the central axis 206 of the wearable video device 200. In addition, the first reference axis 410 is perpendicular to a second reference axis 420. The front end of the first camera module 270 is parallel with the second reference axis 420. According to various embodiments of the present disclosure, and as illustrated in this example, the front end of the first camera module 270 is position on the second reference axis 420.

The front end of the first camera module 270 is disposed approximately 1 cm ahead of the left ear 11 of the user 10 along the first reference axis 410, and the front end of the first camera module 270 is disposed approximately 5 cm behind the front side 13 of the face along the first reference axis 410. In addition, a lateral end of the first camera module 270 is spaced approximately 2 cm apart from the left ear 11 along the second reference axis 420.

In this example, approximately 28 degrees of the entire angle of view of the first camera module 270 is blocked by the face of the user 10. For example, a sight or a view of the first camera module 270 is limited by the face of the user 10.

FIG. 6 illustrates a view boundary 430 of the first camera module 270 and a view boundary 431 that is limited by being blocked by a face of a user.

FIG. 7 illustrates a case in which an optical axis of a first camera module is rotated. The first axis 300 of the first camera module 270 is rotated outward at approximately 28 degrees from the first reference axis 410. In this example, the front end of the first camera module 270 and the second reference axis 420 form an angle of approximately 28 degrees as illustrated by reference axis 271.

In this example, the entire angle of view of the first camera module 270 (e.g., as defined by the view boundary 430 of the first camera module 270) is not blocked by the face of the user 10.

In the present disclosure, a view area of interest refers to an overlap area of a view of the first camera module 270 and a view of the second camera module 275 (e.g., matched view parts). In addition, a view area of uninterest indicates a non-overlap area in the entire view of the first and second camera modules 270 and 275.

Figure 8:
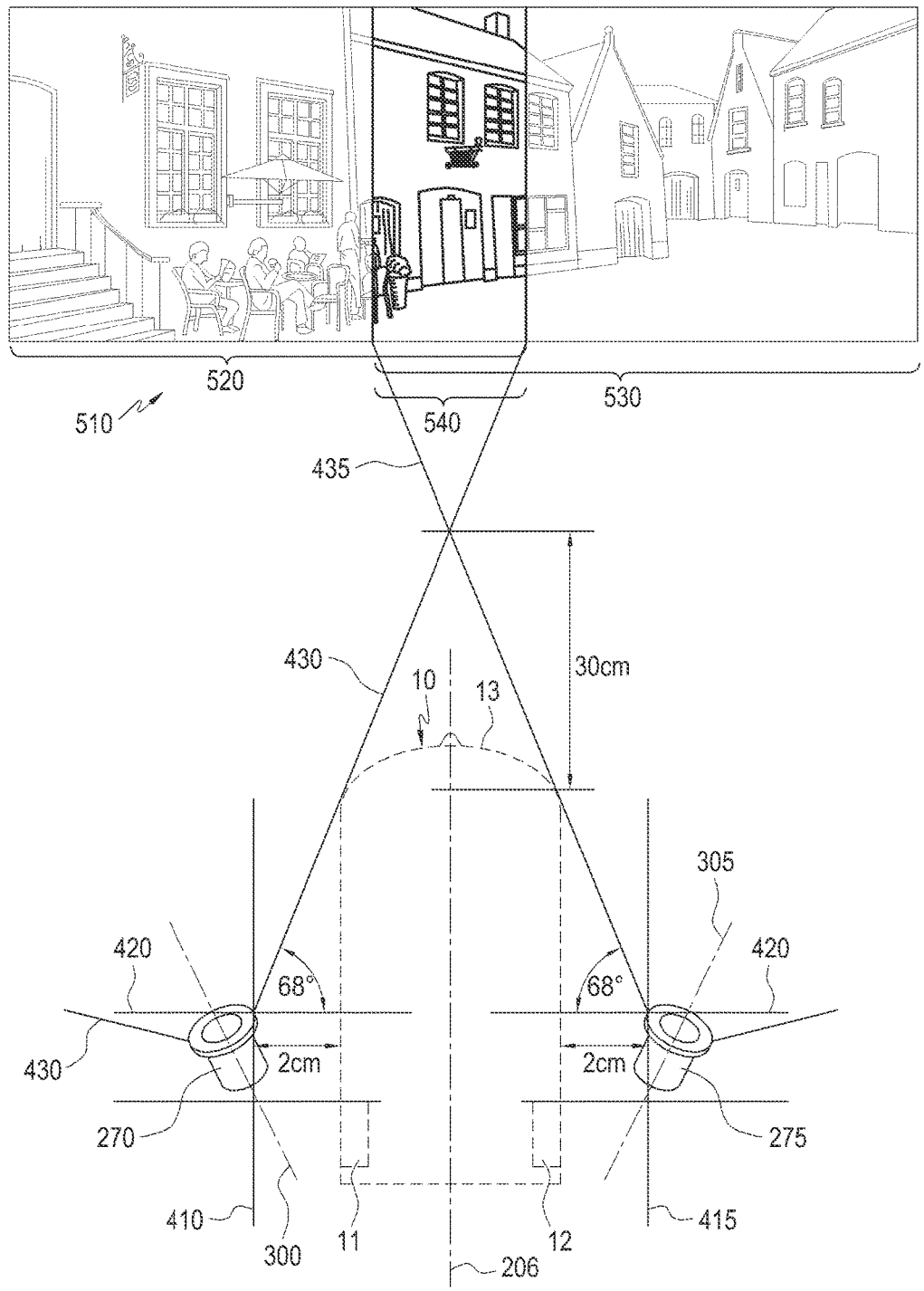
FIG. 8 is a diagram illustrating a view area of interest according to an embodiment of the present disclosure.

FIG. 8 is a diagram illustrating a view area of interest according to an embodiment of the present disclosure.

Referring to FIG. 8, a view area of interest 540 corresponds to an area at which a view of the first camera module 270 and a view of the second camera module 275 overlaps in an ambient view viewed by the user 10. A view boundary 430 and a view boundary 435 (or an angle of view boundary) of each of the first camera module 270 and the second camera module 275 forms an angle of approximately 68 degrees with the second reference axis 420. In addition, the view boundary 430 of the first camera module 270 and the view boundary 435 of the second camera module 275 meet at a location that is spaced approximately 30 cm apart from the front side 13 of the face of the user. An optical axis 300 of the first camera module 270 and an optical axis 305 of the second camera module 275 may be rotated outward from 10 to 40 degrees from the first references axes 410 and 415 that are parallel with the central axis 206 of the wearable video device 200. According to the present example of various embodiments of the present disclosure, the optical axis 300 and the optical axis 305 may be rotated at 28 degrees. Therefore, the first and the second optical axes may form an angle of 20 to 80 degrees. According to various embodiments of the present disclosure, preferably, the optical axis 300 and the optical axis 305 may be rotated outward from 23 to 33 degrees from the first reference axis 410 of the first camera module 270 and the first reference axis 415 of the second camera module 275.

In an ambient view 510 of FIG. 8, a first view part 520 included in the view of the first camera module 270 and a second view part 530 included in the view of the second camera module 275 partially overlap, and the partial overlap view part 540 corresponds to a view area of interest.

In the present example of various embodiments of the present disclosure, the wearable video device 200 transmits first image data corresponding to the first view part 520 and second image data corresponding to the second view part 530, to an external electronic device. According to various embodiments of the present disclosure, the wearable video device 200 determines the overlap view part 540 (e.g., view area of interest), may transmit positional information of the view area of interest 540 and the first image data and/or the second image data to an external electronic device or may transmit an image of the view area of interest 540 to the external device.

Figure 9:
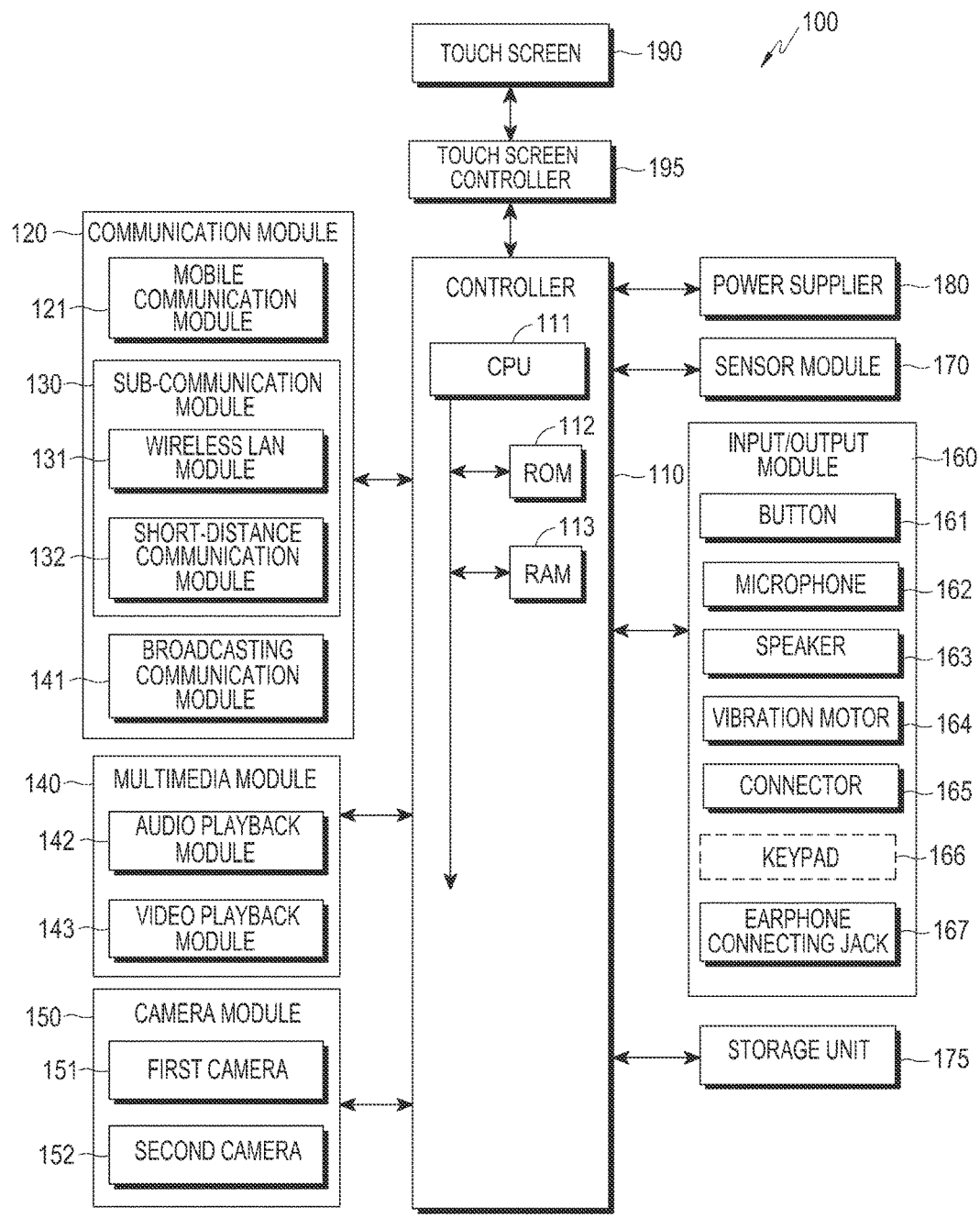
FIG. 9 is a schematic block diagram illustrating a portable terminal according to an embodiment of the present disclosure.
Figure 10:
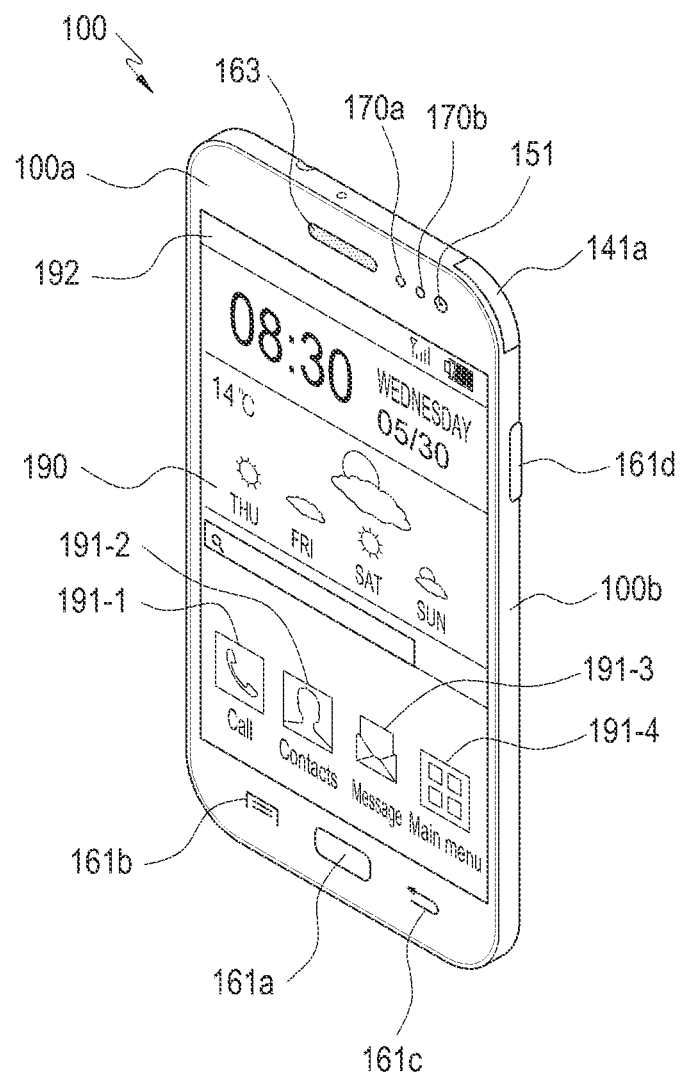
FIG. 10 is a front side perspective view of a portable terminal according to an embodiment of the present disclosure.
Figure 11:
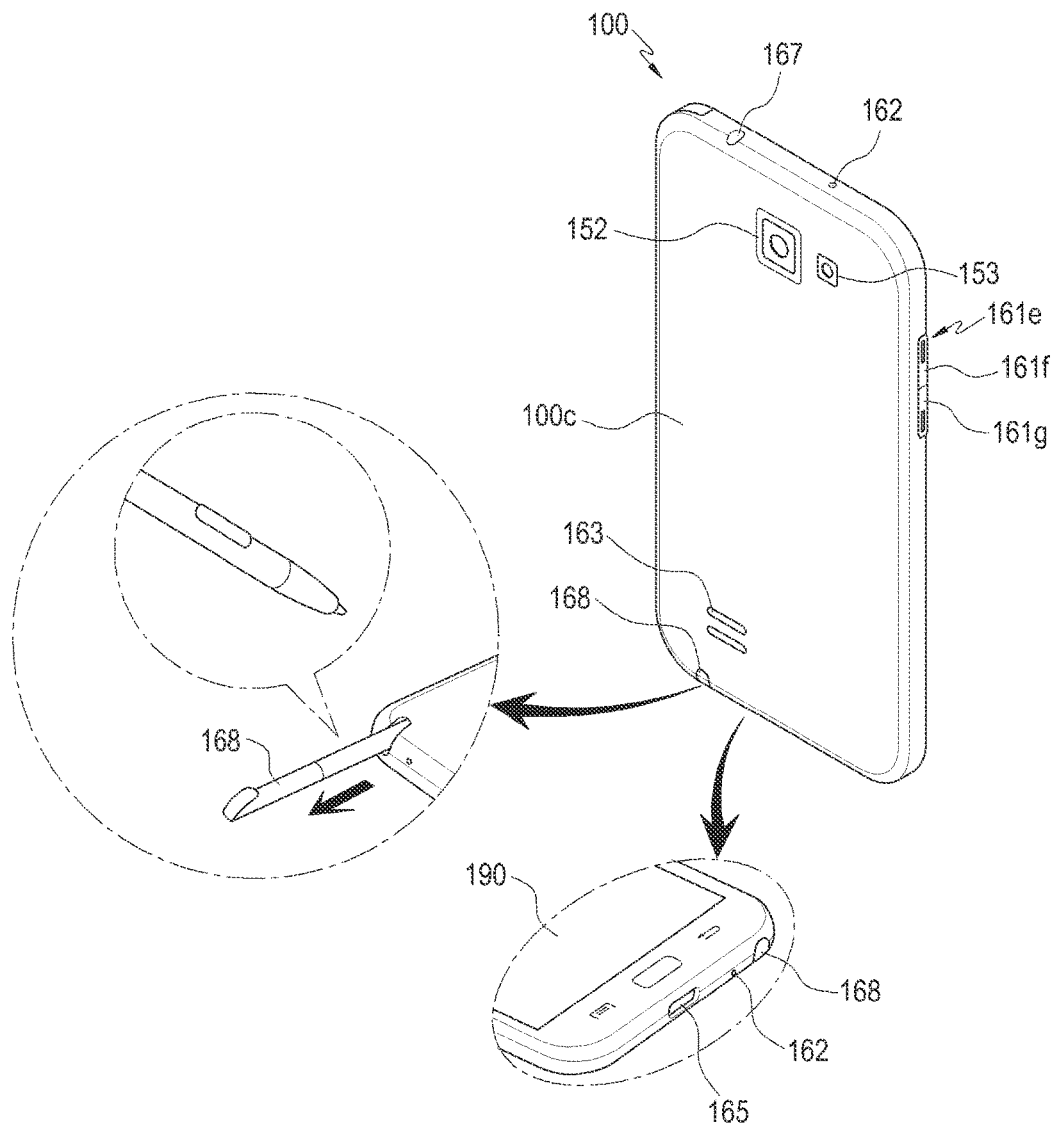
FIG. 11 is a back side perspective view of a portable terminal according to an embodiment of the present disclosure.

FIG. 9 is schematic block diagram illustrating a portable terminal according to an embodiment of the present disclosure, FIG. 10 is a front side perspective view of a portable terminal according to an embodiment of the present disclosure, and FIG. 11 is a back side perspective view of a portable terminal according to an embodiment of the present disclosure.

Referring to FIG. 9, a portable terminal 100 may include a second controller 110, a second communication module 120, a multi-media module 140, a third camera module 150, a second input/output module 160, a second sensor module 170, a second storage unit 175, a second power supplier 180, a touch screen 190, a touch screen controller 195, and/or the like.

The portable terminal 100 may be an electronic device and may be connected with an external electronic device through an external device connecting unit such as the second communication module 120, a connector 165, an earphone connecting jack 167, and/or the like. The "external electronic device" may include one of the various devices, such as the wearable video device 200 that is wiredly or wirelessly connected with the portable terminal 100, an earphone, an external speaker, a Universal Serial Bus (USB) memory, a charger, a cradle/dock, a mobile payment related device, a health management device (e.g., a glucometer and the like), a game console, a car navigation device, a short-distance communication device such as a Bluetooth communication device, a NFC device, a WiFi Direct Communication device, and a radio Access Point (AP), and the like. According to various embodiments of the present disclosure, the external electronic device may include one of the electronic devices such as another portable terminal, a portable phone, a smart phone, a tablet PC, a desktop PC, a server, and the like.

The second communication module 120 may include a mobile communication module 121, a sub-communication module 130, and a broadcasting communication module 141. The sub communication module 130 includes at least one of a wireless LAN module 131 and a short distance communication module 132.

The multimedia module 140 includes at least one of an audio playback module 142 and a video playback module 143.

The third camera module 150 includes at least one of a first camera 151 and a second camera 152.

The second input/output module 160 includes at least one of a button 161, a second microphone 162, a third speaker 163, a vibration motor 164, a connector 165, a keypad 166, and an earphone connecting jack 167.

The second controller 110 includes a Central Processing Unit (CPU) 111, a ROM 112 storing a control program for controlling the portable terminal 100, and a RAM 113 used as a storage area for storing a signal or data input from the outside of the portable terminal 100 or for work performed in the portable terminal 100. According to various embodiments of the present disclosure, the CPU 111 may include a various number of cores. For example, the CPU 111 may include a single core, a dual core, a triple core, a quad core, and the like. The CPU 111, the ROM 112, and the RAM 113 may be mutually connected to each other through an internal bus.

The second controller 110 may control the second communication module 120, the multimedia module 140, the third camera module 150, the second input/output module 160, the second sensor module 170, the second storage unit 175, the second power supplier 180, the touch screen 190, and the touch screen controller 195.

The second communication module 120 may be provided for a direct connection with an external electronic device or a connection with the external electronic device through a network, and may be a wired or wireless communication module. The second communication module 120 may wiredly or wirelessly transmit data from the second controller 110, the second storage unit 175, the third camera module 150, and the like, or wiredly or wirelessly receive data through an external communication line or the air so as to transfer the data to the second controller 110 or to store the data in the second storage unit 175.

The mobile communication module 121 enables the portable terminal 100 to be connected with an external electronic device through mobile communication using at least one antenna (not illustrated) based on a control of the second controller 110. The mobile communication module 121 transmits/receives a wireless signal for exchanging or uni-directionally transmitting or receiving data of a voice call, a video call, a Short Message Service (SMS), a Multimedia Message Service (MMS), and/or the like, to/from a portable phone (not illustrated), a smart phone (not illustrated), a tablet PC, or another device (not illustrated) having a phone number or a network address input into the portable terminal 100.

The sub communication module 130 includes at least one of the wireless LAN module 131 and the short distance communication module 132. For example, the sub communication module 130 includes only the wireless LAN module 131, only the short distance communication module 132, or both the wireless LAN module 131 and the short distance communication module 132.

The wireless LAN module 131 may be Internet-connected in a place at which a wireless AP (not illustrated) is installed according to a control of the second controller 110. The wireless LAN module 131 supports a wireless LAN standard (IEEE802.11x) of the Institute of Electrical and Electronics Engineers (IEEE). The short distance communication module 132 may wirelessly perform short distance communication between the portable terminal 100 and an image forming apparatus (not illustrated) according to a control of the second controller 110. A short distance communication scheme may include Bluetooth, IrDA communication, WiFi-Direct communication, NFC, and the like.

The broadcasting communication module 141 may receive a broadcasting signal (e.g., a TV broadcasting signal, a radio broadcasting signal, a data broadcasting signal, and/or the like) and broadcasting supplement information (e.g., Electronic Program Guide (EPG), Electronic Service Guide (ESG), and/or the like) output from a broadcasting station through a broadcasting communication antenna (not illustrated) according to a control of the second controller 110.

The multimedia module 140 includes the audio playback module 142 or the video playback module 143. The audio playback module 142 may play back, through the third speaker 163, a digital audio file (e.g., a file having a file extension of mp3, wma, ogg, wav, or the like) stored or received according to a control of the second controller 110. The video playback module 143 may play back, through the touch screen 190, a digital video file (e.g., a file having a file extension of mpeg, mpg, mp4, avi, mov, mkv, or the like) stored or received according to a control of the second controller 110.

Further, the audio playback module 142 and/or the video playback module 143 of the multimedia module 140 may be included in the second controller 110.

The third camera module 150 includes at least one of the first camera 151 and the second camera 152 for capturing a still image or a video according to a control of the second controller 110. Further, the first camera 151 and/or the second camera 152 may include an auxiliary light source (e.g., a flash (not illustrated) providing light required for capturing. The first camera 151 may be disposed on a front side of the portable terminal 100, and the second camera 152 may be disposed on a back side of the portable terminal 100. According to various embodiments of the present disclosure, the first camera 151 and the second camera 152 may be disposed to be close to each other (e.g., an interval between the first camera 151 and the second camera 152 is greater than 1 cm and less than 8 cm) and may capture a three dimensional still image or a three dimensional video.

The first camera 151 and the second camera 152 may include a lens system, an image sensor, a flash, and/or the like. The first camera 151 and the second camera 152 each convert an optical signal input (or captured) through the lens system into an image signal and output the image signal to the second controller 110. Then, the user may capture a video or a still image through the first camera 151 and the second camera 152.

The driving unit drives the image sensor based on a control of the second controller 110. The driving unit operates pixels of the image sensor based on a control signal received from the second controller 110, and image data output from the pixels is output to the second controller 110.

The second controller 110 processes, based on a frame unit, an image input from each of the first camera 151 and the second camera 152, an image stored in the second storage unit 175, and an image received from the wearable video device 200, and outputs, to the touch screen 190, an image frame that is converted to be suitable for the characteristics (e.g., a size, a picture quality, a definition, and the like) of the touch screen 190.

The second input/output module 160 includes at least one of a plurality of buttons 161, the second microphone 162, the third speaker 163, the vibration motor 164, the connector 165, the keypad 166, the earphone connecting jack 167, and the like. The second input/output module 160 is used as a means to receive a user input or to inform the user of information. As other examples of the second input/output module 160, which may not be limited thereto, a mouse, a trackball, a joystick, or a cursor control such as cursor direction keys may be provided for information communication with the second controller 110 and a control of a motion of the cursor on the touch screen 190.

The button 161 may be formed on a front side 100a, a lateral side 100b, or a back side 100c of the portable terminal 100, and may include at least one of a power button 161d, a volume button 161e having a volume increase button 161f and a volume decrease button 161g, a menu button 161h, a home button 161a, a back button 161c, and a search button.

The second microphone 162 receives a voice or a sound to generate an electrical signal according to a control of the second controller 110.

The third speaker 163 may output sounds corresponding to various signals (e.g., a wireless signal, a broadcasting signal, a digital audio file, a digital video file, taking a picture, and/or the like) of the mobile communication module 121, the sub communication module 130, the multimedia module 140, or the third camera module 150 to the outside of the portable terminal 100 according to a control of the second controller 110. The third speaker 163 may output a sound (e.g., button tone corresponding to phone call and ring back tone) corresponding to a function performed by the portable terminal 100. One or a plurality of third speakers 163 may be formed on a proper position or positions of the portable terminal 100. For example, a third speaker 163 may be formed on a front side 100a of the portable terminal 100, and/or a third speaker 163 may be formed on a back side 100c of the portable terminal 100.

The vibration motor 164 may convert an electrical signal to a mechanical vibration according to a control of the second controller 110. For example, when the portable terminal 100 in a vibration mode receives a voice or video call from another device (not illustrated), the vibration motor 164 is operated. One or a plurality of the vibration motors 164 may be formed in the portable terminal 100. The vibration motor 164 may be operated in response to a user's touch motion that touches the touch screen 190 and successive motions of a touch on the touch screen 190.

The connector 165 may be used as an interface for connecting the portable terminal 100 with an external electronic device (not illustrated) or a power source (not illustrated). The portable terminal 100 may transmit data stored in the storage unit 175 of the portable terminal 100 to an external device (not illustrated) or may receive data from an external electronic device (not illustrated), through a wired cable connected to the connector 165 according to a control of the second controller 110. According to various embodiments of the present disclosure, the portable terminal 100 may receive power from a power source (not illustrated) through the wired cable connected to the connector 165 or charge a battery (not illustrated) using the power source.

The keypad 166 may receive a key input from a user for the control of the portable terminal 100. The keypad 166 includes a physical keypad (not illustrated) formed in the portable terminal 100 or a virtual keypad (not illustrated) displayed on the touch screen 190. The physical keypad (not illustrated) formed in the portable terminal 100 may be excluded according to a capability or structure of the portable terminal 100.

An earphone (not illustrated) is inserted into the earphone connecting jack 167 to be connected with portable terminal 100.

The second sensor module 170 includes at least one sensor for detecting a state (position, point of compass, motion or the like) of the portable terminal 100. For example, the second sensor module 170 may include a proximity sensor for detecting whether a user approaches the portable terminal 100, an illumination sensor (not illustrated) for detecting an amount of ambient light of the portable terminal 100, a motion/point of compass sensor for detecting motions of the portable terminal 100 (e.g., rotation, acceleration, deceleration, vibration, and the like of the portable terminal 100), an altimeter for measuring an atmospheric pressure to detect an altitude, a GPS sensor for detecting a position of a portable terminal, and/or the like. Further, the motion/point of compass sensor may include an acceleration sensor, a geo-magnetic sensor (not illustrated) for detecting a point of the compass by using the Earth's magnetic field, a gravity sensor for detecting a gravity action direction, a gyro sensor, an impact sensor, a compass sensor, and/or the like. The GPS sensor may receive radio waves from a plurality of GPS satellites (not illustrated) in Earth's orbit and calculate a position of the portable terminal 100 by using Time of Arrival from the GPS satellites (not illustrated) to the portable terminal 100. The second sensor module 170 may detect a state of the portable terminal 100, may generate a signal corresponding to the detection, and may transmit the generated signal to the second controller 110. The sensors of the sensor module 170 may be added or omitted according to the capability of the portable terminal 100.

The second storage unit 175 may store a signal or data input/output to/from the second communication module 120, the multimedia module 140, the third camera module 150, the second input/output module 160, the second sensor module 170, or the touch screen 190, based on a control of the second controller 110. The second storage unit 175 may store a control program and application for controlling the portable terminal 100 or the second controller 110.

The term "storage unit" includes the second storage unit 175, the ROM 112 and the RAM 113 within the second controller 110, or a memory card (not illustrated) (e.g., an SD card, a memory stick, and/or the like) installed in the portable terminal 100.

According to various embodiments of the present disclosure, the second storage unit 175 may store various applications such as a navigation, video calls, games, and the like; images to provide a Graphical User Interface (GUI) related to the applications; databases or data related to user information, documents and methods for recognizing and processing a view area of interest of a user; background images (e.g., a menu screen, an idle screen, and/or the like) or operating programs for operating the portable terminal 100; and images captured by the third camera module 150. The second storage unit 175 may be a machine-readable (e.g., a computer-readable) medium, and the machine-readable medium may be a storage medium.

The second power supplier 180 may provide power to one or a plurality of second batteries (not illustrated) disposed in the portable terminal 100, based on a control of the second controller 110. The one or the plurality of second batteries (not illustrated) supply power to the portable terminal 100. Further, the second power supplier 180 may supply power input from an external power source (not illustrated) to the portable terminal 100 through a wired cable connected to the connector 165. In addition, the second power supplier 180 may supply power wirelessly input from the external power source through a wireless charging technology to the portable terminal 100.

The touch screen 190 may display data input from the second controller 110 to the user, and may provide GUIs corresponding to various services (e.g., a phone call, data transmission, broadcasting, and capturing a picture) to the user. The touch screen 190 may transmit an analog signal corresponding to at least one touch input or hovering input into the GUI to the touch screen controller 195. The touch screen 190 may receive at least one input through a user input means (e.g., a finger, a pen or the like). Further, the touch screen 190 may receive successive motions of one touch (e.g., dragging). The touch screen 190 may transmit an analog signal corresponding to the successive motions of the input touch to the touch screen controller 195. The touch screen 190 may be commonly named as a display unit.

According to various embodiments of the present disclosure, the display unit may be formed of a display unit that does not have a touch sensing function, such as a Liquid Crystal Display (LCD), an Organic Light Emitting Diode (OLED), a Light Emitting Diode (LED), and the like.

Further, a pen 168 may be formed in a lower end of the portable terminal 100. The pen 168 may be inserted into the portable terminal 100 for storage, and may be withdrawn and detached from the portable terminal 100 when being used. In addition, a pen attachment/detachment switch (not illustrated) operating in accordance with attachment and detachment of the pen 168 is contained in one area within the portable terminal 100, and provides a signal corresponding to the attachment and detachment of the pen 168 to the second controller 110.

Further, a touch screen input may not be limited to a contact between the touch screen 190 and a user input means (a finger or the pen 168), and may include a non-contact (the touch screen 190 and the user input means are spaced, for example, 1 cm or less apart from each other). A recognizable distance of the touch screen 190 may be changed according to a capability or structure of the portable terminal 100. Particularly, the touch screen 190 and/or the pen 168 is configured to change an output value thereof according to an interval between the touch screen 190 and a user input means such that a touch event by a contact between the touch screen 190 and the user input means and an input (e.g., hovering) event in a non-contact state are distinguishably detected. For example, the touch screen 190 is configured to output different values by distinguishing a value (e.g., a current value, a voltage value, a capacitance value, and/or the like) detected by the touch event and a value detected by the hovering event.

Meanwhile, the touch screen controller 195 converts an analog signal received from the touch screen 190 to a digital signal (e.g., (X,Y) coordinates and an intensity of an input (or a detected value)), and transmits the digital signal to the second controller 110. The second controller 110 may control the touch screen 190 using the digital signal received from the touch screen controller 195. For example, the second controller 110 allows a short-cut icon (or an application corresponding thereto) displayed on the touch screen 190 to be selected or executed in response to a touch event or a hovering event. Further, the touch screen controller 195 may be included in the second controller 110 or the touch screen 190.

Further, the touch screen controller 195 may calculate a distance between the user input means and the touch screen 190 based on a value output from the touch screen 190, and convert the calculated distance value to a digital signal (e.g., a Z coordinate) and then provide the digital signal to the second controller 110.

Moreover, the touch screen controller 190 may determine whether the user input means and the touch screen 190 are in contact with each other based on the value output from the touch screen 190, may convert a value indicating whether the user input means and the touch screen 190 are in contact with each other into a digital signal, and may provide the digital signal to the second controller 110.

In addition, in order to distinguishably detect an input (e.g., a pen finger input or the like) by a passive-type first user input means (e.g., a body part such as a finger, and/or the like) and an input (e.g., a pen input, and/or the like) by the pen 168 corresponding to an active-type second user input means, the touch screen 190 may include at least two touch screen panels which may detect the finger input and the pen input, respectively. For the user input means, a passive type and an active type may be distinguished based on a capability of generating or inducing energy such as electromagnetic waves and the like for outputting the same. The at least two touch screen panels provide different output values to the touch screen controller 195, and the touch screen controller 195 recognizes the values input from the at least two touch screen panels as different values so as to determine whether the input from the touch screen 190 is the input by the finger or the pen. For example, the touch screen 190 may have a structure in which a touch screen panel in a capacitive type and a touch screen panel in an Electro-Magnetic Resonance (EMR) type are combined. Further, as described above, the touch screen 190 may include touch keys such as the menu button 161b, the back button 161c, and the like, and accordingly, a finger input or a finger input on the touch screen 190 of the present disclosure includes a touch input on the touch key.

Referring to FIG. 10, the touch screen 190 is disposed on a center of the front side 100a of the portable terminal 100. The touch screen 190 has a large size to occupy most of the front side 100a of the portable terminal 100. FIG. 10 illustrates an example according to which a main home screen is displayed on the touch screen 190. The main home screen is a first screen displayed on the touch screen 190 when power of the portable terminal 100 is turned on. Further, when the portable terminal 100 has several pages of different home screens, the main home screen may be the first home screen of the several pages of the home screens. Short-cut icons 191-1, 191-2, and 191-3 for executing frequently used applications, a main menu icon 191-4, time, weather, and the like may be displayed on the home screen. When the short-cut icons 191-1, 191-2, and 191-3 is selected, the touch screen 190 may display a corresponding application window, and when the main menu icon 191-4 is selected, the touch screen 190 may display a menu screen. Further, a status bar 192 which displays the status of the portable terminal 100 such as a battery charging status, a received signal intensity, and a current time may be formed on the upper end of the touch screen 190.

The touch keys such as the home button 161a, the menu button 161b, the back button 161c, and the like, mechanical keys, or a combination thereof may be formed below the touch screen 190. Further, the touch keys may be a part of the touch screen 190.

When the home button 161a is selected, the touch screen 190 displays a main home screen. For example, when the home button 161a is pressed in a state in which a home screen different from the main home screen, the menu screen, or an application screen is displayed on the touch screen 190, the main home screen is displayed on the touch screen 190. For example, when the home button 161a is touched while an application window is displayed on the touch screen 190, the main home screen shown in FIG. 10 may be displayed on the touch screen 190. In addition, the home button 161a may be used to display recently used applications or a task manager on the touch screen 190.

The menu button 161b provides a connection menu which may be used on the touch screen 190. The connection menu includes a widget addition menu, a background changing menu, a search menu, an editing menu, an environment setup menu, and the like.

The back button 161c may be used for displaying the screen which was executed immediately before a currently executed screen, or terminating or interrupting a currently executed application.

The first camera 151, the illumination sensor 170a, and the proximity sensor 170b may be disposed on edges of the front side 100a of the portable terminal 100. The second camera 152, the flash 153, and the third speaker 163 may be disposed on the back side 100c of the portable terminal 100.

For example, the power button 161d and the volume buttons 161e may be disposed on the lateral side 100b of the right or left side of the portable terminal 100, and a terrestrial DMB antenna 141a for broadcasting reception, and the earphone connecting jack 167 may be disposed on the lateral side 100b of the upper end. According to various embodiments of the present disclosure, at least one second microphone 162 and the like may be disposed on the lateral side 100b of the upper end and the lower end of the portable terminal 100. The DMB antenna 141a may be fixed to the portable terminal 100 or may be formed to be detachable from the portable terminal 100. An earphone may be inserted into the earphone connecting jack 167.

Further, the connector 165 is formed on the lateral side 100b of the lower end of the portable terminal 100. A plurality of electrodes are formed in the connector 165, and the connector 165 may be wiredly connected to an external device.

According to various embodiments of the present disclosure, the second controller 110 included in the portable terminal 100 may be configured to execute, particularly, a method of recognizing and processing a view area of interest of a user.

According to various embodiments of the present disclosure, the portable terminal 100 establishes a connection with the wearable video device 200 based on a predetermined communication scheme, and processes a programmed operation with respect to an image of a view area of interest or an image of a view area of uninterest received from the wearable video device 200, based on user input information. The user input information may be input through the wearable video device 200 or the portable terminal 100. The image of the view area of interest may be received directly from the wearable video device 200 or may be an overlap image area that the portable terminal 100 extracts from the first and second images received from the wearable video device 200. According to various embodiments of the present disclosure, the portable terminal 100 may receive coordinates of the view area of interest from the wearable video device 200, and/or may extract the image of view area of interest based on the coordinates. When the portable terminal 100 receives the coordinates of the view area of interest from the wearable video device 200, the wearable video device 200 may transmit, to the portable terminal 100, one of the first and second images.

The programmed operation that the portable terminal 100 and/or the wearable video device 200 may process includes storing or transmitting, to the outside, the image of view area of interest or the image of view area of uninterest, searching for data associated with a subject included in the image of view area of interest or the image of view area of uninterest, and/or outputting a searched result.

Figure 12:
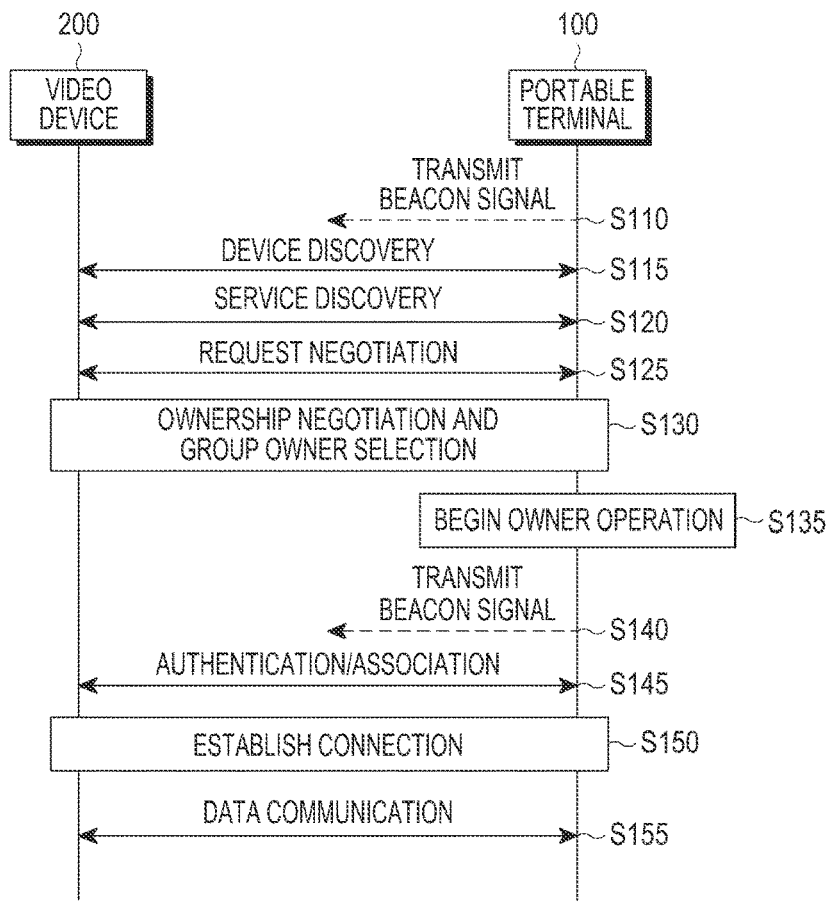
FIG. 12 is a signaling flowchart illustrating a connection procedure between a video device and a portable terminal according to an embodiment of the present disclosure.

FIG. 12 is a signaling flowchart illustrating a connection procedure between a video device and a portable terminal according to an embodiment of the present disclosure.

Various embodiments of the present disclosure, although not limited to the present example, exemplify that the video device 200 and the portable terminal 100 establish a connection through a WiFi Direct, and performs data communication. According to the present example of various embodiments of the present disclosure, the portable terminal 100 corresponds to a master of a group and the video device 200 corresponds to a slave of the group.

Referring to FIG. 12, at operation S110, each of the video device 200 and the portable terminal 100 periodically transmit a beacon signal (or a message). The beacon signal may include a device Identification (ID) corresponding to unique identifier information.

At operation S115, the video device 200 and the portable terminal 100 execute a discovery procedure that searches for an adjacent device, so that the video device 200 and the portable terminal 100 identify each other.

At operation S120, the video device 200 and the portable terminal 100 execute a service discovery procedure that searches for a supportable service, so that each of the video device 200 and the portable terminal 100 determines whether the other party is capable of supporting a desired service.

At operation S125, the portable terminal 100 determines an intention value with respect to a position of a group owner, based on the searched service. For this, the portable terminal 100 may determine the intention value by referring to a service and intention value mapping table. Subsequently, the portable terminal 100 generates a group owner negotiation request message (hereinafter, referred to as a negotiation request message) including the determined intention value of the portable terminal 100. Subsequently, the portable terminal 100 transmits, to the video device 200, the group owner negotiation request message. In the present example of various embodiments of the present disclosure, the portable terminal 100 determines (e.g., selects) the highest intention value thereof so as to be a group owner. Conversely, the video device 200 determines (e.g., selects) the lowest intention value thereof so as to not be a group owner.

According to various embodiments of the present disclosure, in response to the negotiation request message, the video device 200 transmits, to the portable terminal 100, a group owner negotiation response message (hereinafter, referred to as a negotiation response message) including the intention value of the video device 200. Conversely, when the video device 200 transmits a negotiation request message including the intention value first, the portable terminal 100 may transmit a negotiation response message including the determined intention value of the portable terminal 100. As described above, a subject that sends a negotiation request message may not always need to be the portable terminal 100, and a negotiation message may be exchanged to determine an intention value of a partner.

In this case, the negotiation request message includes a group ID, and the group ID may be generated using a MAC address of the portable terminal 100 or video device 200 that requests negotiation, a random number, an ID of itself, and the like.

For example, according to various embodiments of the present disclosure, when the video device 200 already belongs to another group, the video device 200 compares a group ID included in a negotiation request message with a group ID stored in advance, and may refuse the negotiation request when the comparison result shows that two group IDs do not match. When the negotiation is refused, the following procedures may not be executed.

At operation S130, the portable terminal 100 determines the intention value included in the negotiation response message, and the video device 200 determines the intention value included in the negotiation request message. Ownership negotiation and group owner selection may be performed between the portable terminal 100 and the video device 200. In particular, the portable terminal 100 compares the intention value thereof and the intention value of the video device 200, so as to select an entity that has a higher intention value as a group owner. In the present example of various embodiments of the present disclosure, it is exemplified that the portable terminal 100 has a higher intention value than the intention value of the video device 200.

At operation S135, the portable terminal 100 begins an owner operation. For example, the portable terminal 100 executes an operation like an AP (or a server or a master), as opposed to a client (or a slave), so as to execute a group owner operation.

At operation S140, the portable terminal 100 transmits a beacon signal.

At operation S145, the portable terminal 100 executes an authentication/association procedure with the video device 200.

At operation S150, a connection between the portable terminal 100 and the video device 200 is established.

At operation S155, the portable terminal 100 and the video device 200 perform data communication with each other.

In the following various embodiments of the present disclosure, each programmed operation may be executed by controllers 110 and 260 of the portable terminal 100 and the video device 200 using other component elements such as communication modules 120 and 250, the sensor modules 170 and 220, and the like.

FIGS. 13, 14A, 14B, 14C, and 14D are diagrams illustrating a method of recognizing and processing a view area of interest of a user according to a first embodiment of the present disclosure.

Figure 13:
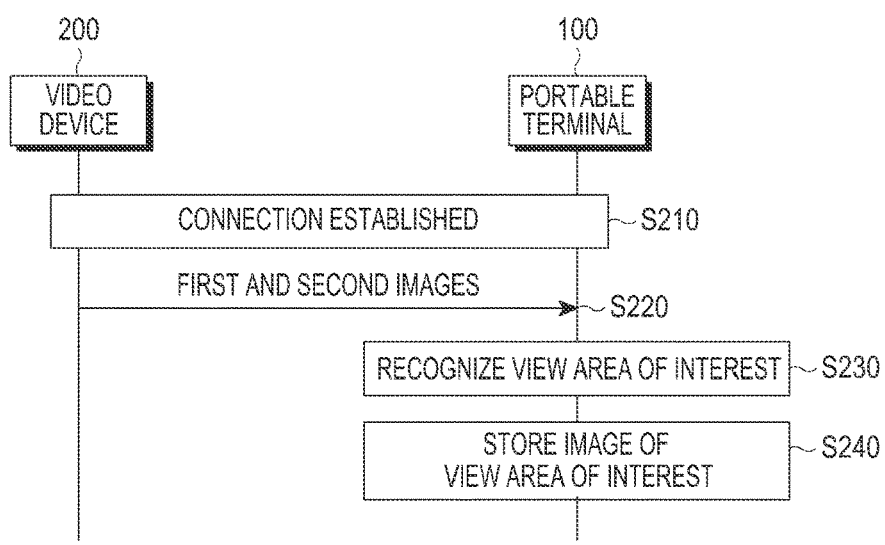
FIGS. 13, 14A, 14B, 14C, and 14D are diagrams illustrating a method of recognizing and processing a view area of interest of a user according to a first embodiment of the present disclosure.

Referring to FIG. 13, at operation S210, a device connection operation is performed, according to which the portable terminal 100 and the video device 200 establish a wireless connection using communication modules 120 and 250. The wireless connection may be established using at least one of the wireless communication protocols such as Wifi (802.11x), infrared, Zigbee, NFC, a Radio Frequency Identification (RFID), Bluetooth, UltraWideBand (UWB), and/or the like. The wireless connection may be started when each of the portable terminal 100 and the video device 200 performs automatic device search, or a user turns on power of the video device 200 using a power button 216 or executes an application displayed on the portable terminal 100.

At operation S220 an operation of transmitting first and second images is performed, according to which the video device 200 transmits the first and second images captured by the first camera module 270 and the second camera module 275 to the portable terminal 100. For example, transmission of the images may be started by a voice command through first microphone 290 or second microphone 162, by user selection/input through first input/output module 210 or second input/output module 160, or may be automatically started by the video device 200. For example, when the user finds a target of interest while viewing around the user, the user may provide a command or an input of "capturing" using a voice through the first microphone 290, and the video device 200 may start image transmission based on user input information, may start transmission of first and second images and user input information, or may transmit the user input information while transmitting the first and second images in real time. Capturing may correspond to capturing a still image or video. For example, transmission of the first and second images may be periodically performed, or may be aperiodically performed when an event, such as a user input, occurs.

At operation S230, an operation of recognizing a view area of interest is performed, according to which the portable terminal 100 recognizes a view area of interest indicating an overlap area through comparing the first and second images.

At operation S240, an operation of storing an image of a view area of interest is performed, according to which the portable terminal 100 extracts a recognized image of a view area of interest from the first or the second image, or a composite image of the first and second images, and stores the extracted image of the view area of interest in the second storage unit 175.

FIGS. 14A to 14D are diagrams illustrating capturing of a view area of interest according to a first embodiment of the present disclosure.

Figure 14A:
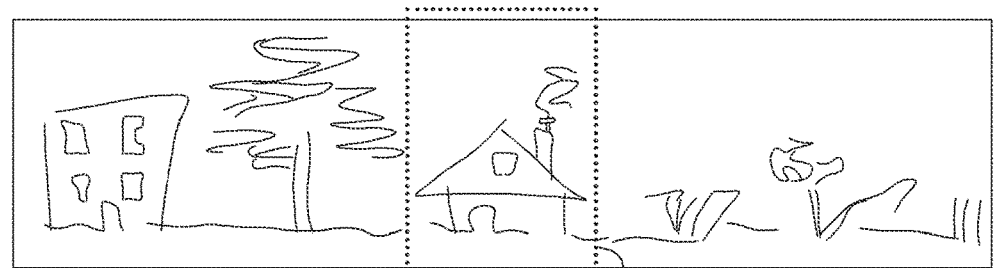
Figure 14B:
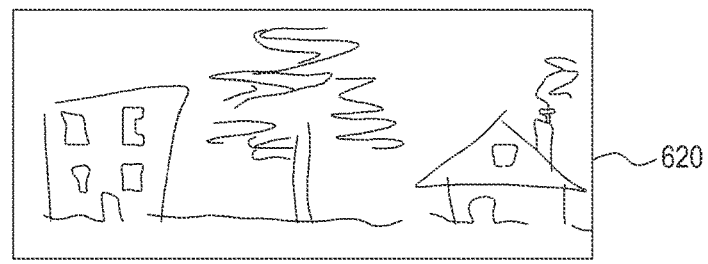
Figure 14C:
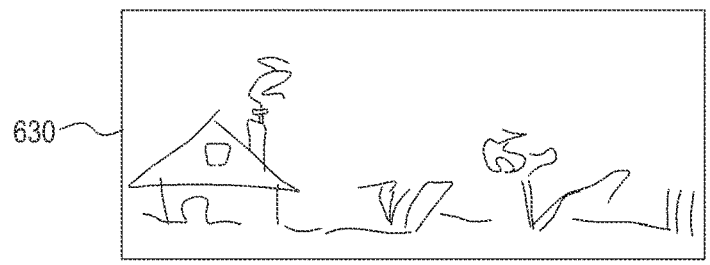

Referring to FIGS. 14A, 14B, 14C, and 14D, FIG. 14A illustrates an entire view 612 captured by the first camera module 270 and the second camera module 275, FIG. 14B illustrates a first view image 620 captured by the first camera module 270, and FIG. 14C illustrates a second view image 630 captured by the second camera module 275. The entire view 612 includes a view area of interest 610 in which a first view captured by the first camera module 270 and a second view 630 captured by the second camera module 275 overlap, in the center of the view. The portable terminal 100 displays an image representing the entire view to a user through the touch screen 190.

Figure 14D:
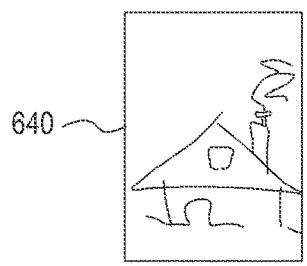

The portable terminal 100 stores, in the second storage unit 175, an image 640 of the recognized view area of interest illustrated in FIG. 14D. The image 640 of the view area of interest may be a sill image or a video.

Figure 15:
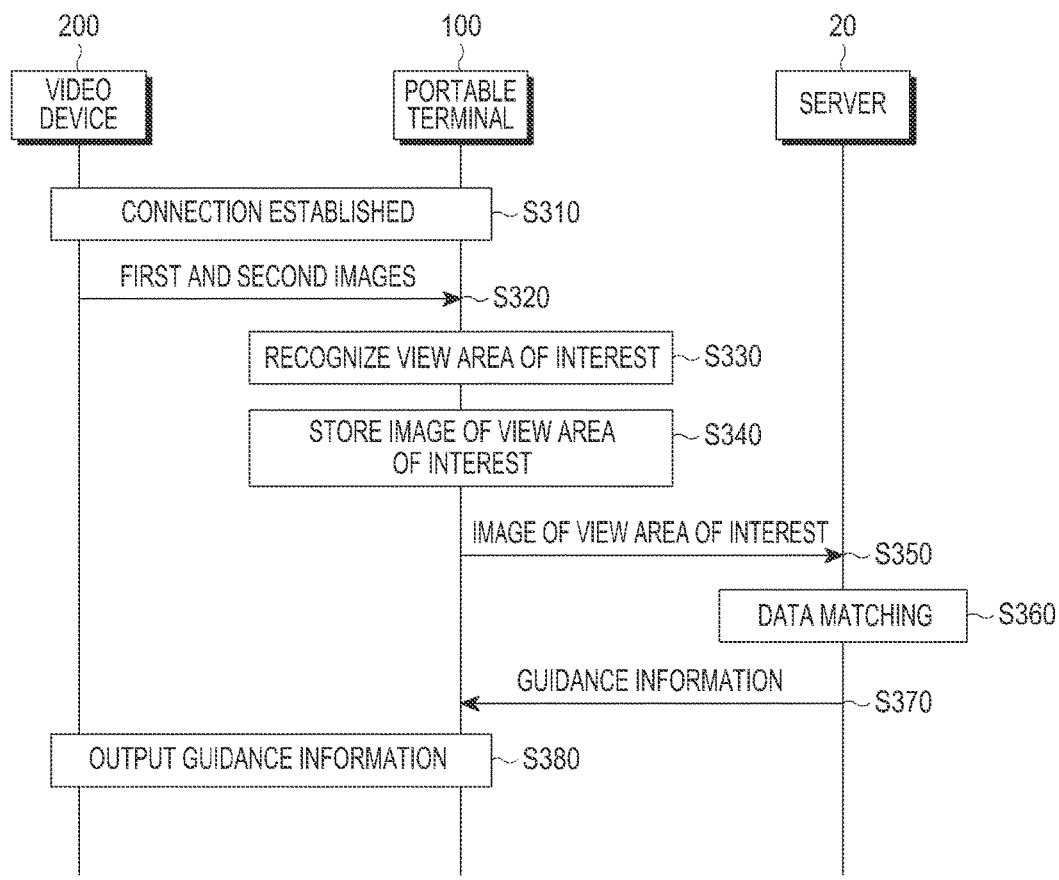
FIGS. 15 and 16 are diagrams illustrating a method of recognizing and processing a view area of interest of a user according to a second embodiment of the present disclosure.
Figure 16:
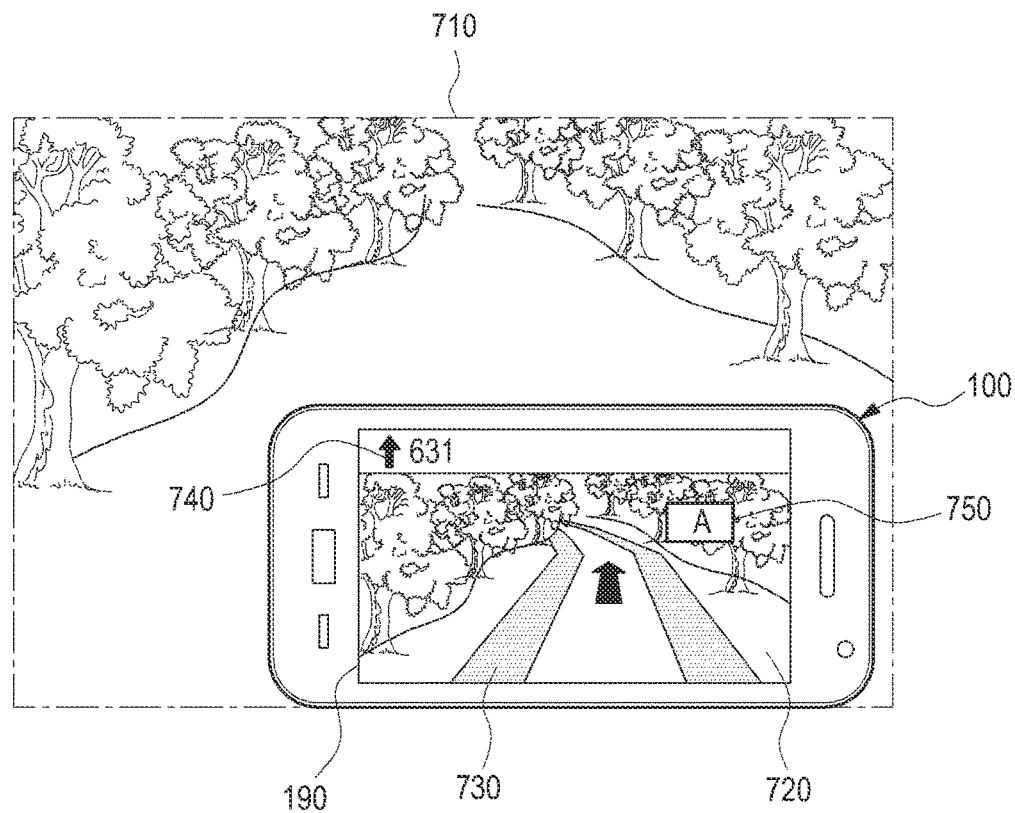

FIGS. 15 and 16 are diagrams illustrating a method of recognizing and processing a view area of interest of a user according to a second embodiment of the present disclosure.

Referring to FIGS. 15 and 16, the second embodiment of the present disclosure exemplifies a case in which a user executes a navigation application of the portable terminal 100.

At operation S310, a device connection operation is performed, according to which the portable terminal 100 and the video device 200 establish a wireless connection using communication modules 120 and 250.

At operation S320, an operation of transmitting first and second images is performed, according to which the video device 200 transmits the first and second images captured by the first camera module 270 and the second camera module 275 to the portable terminal 100.

At operation S330, an operation of recognizing a view area of interest is performed, according to which the portable terminal 100 recognizes a view area of interest indicating an overlap area by comparing the first and second images.

At operation S340 an operation of storing an image of a view area of interest is performed, according to which the portable terminal 100 extracts a recognized image of a view area of interest from the first or the second image, or a composite image of the first and second images, and stores the extracted image of the view area of interest in the second storage unit 175.

At operation S350, the portable terminal 100 transmits the image of the view area of interest, positional information and destination information of the portable terminal 100, to a server 20 using the second communication module 120. The portable terminal 100 generates the positional information using the second sensor module 170. The positional information may include a few or the entirety of sensor values, such as a GPS position measured by a GPS sensor, a point of compass (or a position) measured by a compass sensor, an angular velocity measured by a gyro sensor, and the like. According to various embodiments of the present disclosure, in contrast to the present example, the portable terminal 100 may transmit the first and second images to the server 20, and the server 20 may recognize the view area of interest from the first and second images.

At operation S360, the server 20 matches the image of the view area of interest received from the portable terminal 100 and a map image stored in a storage unit or a data base of the server 20, and generates guidance information corresponding to the matched map image. The guidance information includes Point Of Interest (POI) information indicating information associated with a point of interest and path information associated with a destination or a next intersection such as a distance, a direction, a position, and the like.

At operation S5370, the sever 20 transmits guidance information to the portable terminal 100. Communication between the server 20 and the portable terminal 100 may be performed through a message. At operation S370, the server 20 may include an identifier indicating whether matching succeeds in the guidance information for transmission to the portable terminal 100.

At operation S380, the portable terminal 100 and/or the video device 200 outputs the received guidance information to the user. The portable terminal 100 generates at least one virtual object based on the received guidance information, and composes the virtual object and the image of view area of interest so as to display the composite image to the user through the touch screen 190.

Referring to FIG. 16, the virtual object may include at least one of a first guidance object 730 such as an arrow, a second guidance object 740 indicating a distance and a position, and a POI object 750.

As illustrated in FIG. 16, on the touch screen 190 of the portable terminal 100, an image 720 of the view area of interest 710 that a user views and guidance information overlaying the image 720 of the view area of interest are displayed. The guidance information includes the first path guidance object 730 that is displayed to overlap a road included in the image 720 of the view area of interest and shows an image of a path to follow, the second path guidance object 740 that is displayed to overlap an upper portion of the image 720 of the view area of interest and indicates a distance to an intersection and a direction to follow at an intersection, and the POI object 750 that indicates detailed information of a name or a number of floors of a landmark in the image 720 of the view area of interest, such as a building, a road, a forest, and/or the like. In this example, the POI object 750 may be displayed as a text, an image, and/or the like.

According to various embodiments of the present disclosure, the video device 200 may also (or alternatively) guide the received guidance information with voice through the first speaker 280 and the second speaker 285.

Figure 17:
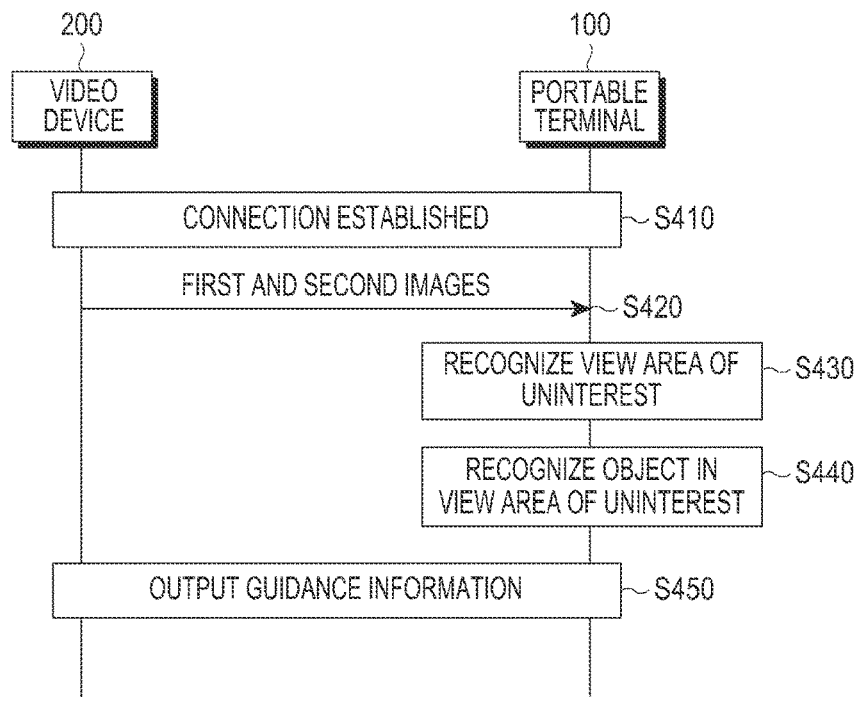
FIGS. 17 and 18 are diagrams illustrating a method of recognizing and processing an area of uninterest of a user according to the first embodiment of the present disclosure.
Figure 18:
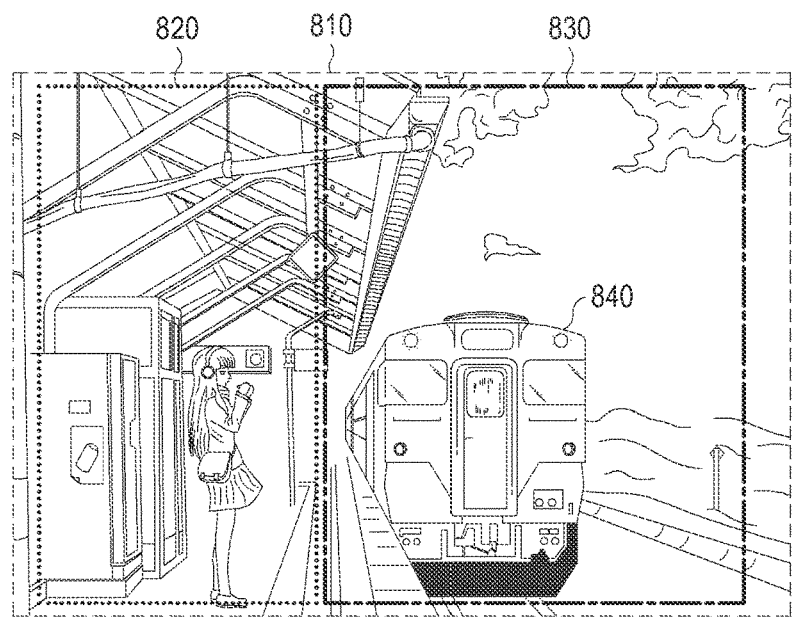

According to various embodiments of the present disclosure, the video system of the present disclosure may recognize that a user focuses on a view area of interest in the entire view of the first camera module 270 and the second camera module 275, or may recognize that the user does not focus on a view area of uninterest. Therefore, according to various embodiments of the present disclosure, the video system provides the user with information associated with an object located in the view area of uninterest (e.g., so as to prevent the user from being in danger or missing important information). For example, the video system may provide the user with information associated with an object located out of a user's view. FIGS. 17 and 18 are diagrams illustrating a method of recognizing and processing a view area of uninterest of a user according to the first embodiment of the present disclosure.

Referring to FIGS. 17 and 18, at operation S410, a device connection operation is performed, according to which the portable terminal 100 and the video device 200 establish a wireless connection using communication module 120 and communication module 250.

At operation S420, an operation of transmitting a first and a second image, in which the video device 200 transmits the first image and the second image captured by the first camera module 270 and the second camera module 275 to the portable terminal 100.

At operation S430, an operation of recognizing a view area of uninterest is performed, according to which the portable terminal 100 recognizes a view area of interest 820 indicating an overlap area of the first image and the second image and a view area of uninterest 830 indicating an area in which the first image and the second image do not overlap, by comparing the first image and the second image. In the present example according to various embodiments of the present disclosure, the user is located in a train station, and the user focuses on a girl who waits for a train 840 in an entire view 810 captured by the first and second camera modules 270 and 275. Therefore, a state of a railroad may not be determined from the view area of interest 820, but may be determined through the view area of uninterest 830.

At operation S440, an operation of recognizing an object in the view area of uninterest is performed, according to which the portable terminal 100 recognizes a dangerous object in the view area of uninterest 830. For example, the portable terminal 100 recognizes a mobile object in the view area of uninterest 830 based on a general movement detection algorithm, and determines whether the object is dangerous based on whether the object in the view area of uninterest 830 moves, or a direction and a speed of the movement of the mobile object. For example, when the object in the view area of uninterest 830 moves, when the object moves to the user, or when the object in the view area of uninterest 830 moves at a speed over a predetermined threshold value, the portable terminal 100 may recognize the object as a dangerous object. In the present example of various embodiments of the present disclosure, the portable terminal 100 recognizes the train 840 corresponding to the mobile object in the view area of uninterest 830 and recognizes that the train 840 approaches the user and thus, may determine the train 840 to be a dangerous object.

At operation S450, an operation of outputting guidance information is performed, according to which the portable terminal 100 transmits predetermined voice data to the video device 200 as a dangerous object is recognized, and the video device 200 outputs received voice data through the first speaker 280 and the second speaker 285. For example, the voice data may be "a dangerous object is approaching", "a train is approaching", and the like. The portable terminal 100 displays an image captured by the first camera module 270 and the second camera module 275 or a previously stored alert image through the touch screen 190, or may output a vibration, an alarm, and the like through the second input/output module 160.

According to various embodiments of the present disclosure, and in contrast to the present example, the portable terminal 100 transmits the first image and the second image to a server, receives information associated with an object in an area of uninterest from the server, displays a composite image of the first image and the second image through the touch screen 190, and simultaneously, displays the received image to overlap the composite image in a form of the POI object of FIG. 16. For example, the received information may include a destination of the train 840, a scheduled time of departure, and the like.

According to various embodiments of the present disclosure, the video device and the portable terminal of the present disclosure may form a single video system. In addition, the component elements of the portable terminal that are not duplicated may be integrated into the video device. For example, instead of the portable terminal, the video device may perform a function that the portable terminal performs. In this example, data communication between the portable terminal and the video device may be omitted, and the video device may output the various data as described above, through a display unit such as a touch screen.

According to various embodiments of the present disclosure, the video device and a display unit may be connected through wireless communication.

According to various embodiments of the present disclosure, the video device may include a display unit in a form of glasses, and may display an image captured by first and second camera modules through the display unit provided in a form of glasses, and simultaneously, may display, to a user, information associated with an object in the image to overlap the image.

The wearable video device of the various embodiments of the present disclosure provides advantages as follows.

According to various embodiments of the present disclosure, the wearable video device may view a subject that a user focuses on and thus, the user may quickly capture the subject at a desired instant.

According to various embodiments of the present disclosure, the wearable video device may be utilized as an accessory of a smart terminal device such as a smart phone and thus, may supplement a camera function of the smart terminal device.

According to various embodiments of the present disclosure, the wearable video device information associated with a subject that a user views through only a voice command by interworking with the smart terminal device.

It may be appreciated that the various embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of an ability thereof to be erased or an ability thereof to be re-recorded. It may be also appreciated that a storage unit that may be included in the video device or the portable terminal is one example of the non-transitory machine-readable devices (e.g., a non-transitory computer-readable storage medium) suitable for storing a program or programs including instructions that embody various embodiments of the present disclosure. Therefore, various embodiments of the present disclosure provide a program including codes for implementing a system or method claimed in any claim of the accompanying claims and a non-transitory machine-readable device (e.g., a non-transitory computer-readable storage medium) for storing such a program. Moreover, such a program as described above can be electronically transferred through an arbitrary medium such as a communication signal transferred through cable or wireless connection, and the present disclosure properly includes the things equivalent thereto.

Further, according to various embodiments of the present disclosure, the portable terminal or video device may receive the program from a program providing device wiredly or wirelessly connected to the device, and may store the program. The program providing device may include a program including instructions to instruct the portable terminal or the video device to perform a method of recognizing and processing an area of interest of a user, a memory storing information required for the method of recognizing and processing the area of interest of the user, and the like, a communication unit to perform wired or wireless communication with the portable terminal or the video device, and a controller to transmit a corresponding program to the portable terminal or the video device, automatically or in response to a request from the portable terminal or the video device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable video device, the wearable video device comprising:
   a communication interface configured to communicate with an external electronic device;
   a first camera configured to generate a first image;
   a second camera configured to generate a second image; and
   a controller that controls the first camera and the second camera, and that processes at least a portion of the first image and at least a portion of the second image,
   wherein the controller is configured to:
      transmit the at least a portion of the first image and the at least a portion of the second image to the external electronic device through the communication interface such that the external electronic device displays the transmitted at least a portion of the first image and the at least a portion of the second image and detects that an object in a view area of uninterest is moving at a speed over a predetermined threshold value, wherein the at least a portion of the first image and the at least a portion of the second image include at least one of a view area of interest and the view area of uninterest, the view area of interest is an area which includes at least a portion of overlapped area of the at least a portion of the first image and the at least a portion of the second image, and the view area of uninterest is an area which includes at least a portion of nonoverlapped area of the at least a portion of the first image and the at least a portion of the second image, and
      output at least one of a name of the object and information of the object through at least one speaker based on an audio data received in response to the object being detected as moving at the speed over the predetermined threshold value.

2. The wearable video device of claim 1, wherein the at least one speaker includes:
   a first speaker and a second speaker that are respectively installed in a first hanger and a second hanger of the wearable video device.

3. The wearable video device of claim 1, wherein the controller comprises:
   a storage unit that stores the at least a portion of the first image and the at least a portion of the second image.

4. The wearable video device of claim 3, wherein the controller further comprises:
   an input/output module that receives user input information.

5. The wearable video device of claim 4, wherein the input/output module comprises a microphone configured to receive a voice of a user.

6. The wearable video device of claim 1, wherein the controller is further configured to transmit, to the external electronic device, coordinates of the view area of interest.

7. A non-transitory computer-readable storage medium, storing instructions that, when executed, cause at least one processor to perform a method, the method comprising:
   receiving at least a portion of a first image and at least a portion of a second image from an external electronic device, wherein the first image is captured by a first camera of the external device, and the second image is captured by a second camera of the external device, the at least a portion of the first image and the at least a portion of the second image include at least one of a view area of interest and a view area of uninterest, the view area of interest is an area which includes at least a portion of overlapped area of the at least a portion of the first image and at least a portion of the second image, and the view area of uninterest is an area which includes at least a portion of nonoverlapped area of the at least a portion of the first image and the at least a portion of the second image;
   displaying the at least one of the at least a portion of the first image and the at least a portion of the second image;
   receiving information on a first object in the view area of interest from another external electronic device;
   generating a second object based on the information on the first object;
   displaying the generated second object on the view area of interest; and
   in response to detecting that a third object in the view area of uninterest is moving at a speed over a predetermined threshold value, automatically transmitting an audio data to the external electronic device such that the external electronic device outputs at least one of a name of the third object and information of the third object through at least one speaker.

8. The non-transitory computer-readable storage medium of claim 7, wherein the method further comprises:
   transmitting the at least a portion of the first image and the at least a portion of second images to the other external electronic device.

9. The non-transitory computer-readable storage medium of claim 7, wherein the method further comprises:
   receiving user input information; and
   transmitting the at least a portion of the first image and the at least a portion of the second images to the other external electronic device, based on the user input information.

10. A portable terminal comprising:
    a communication interface;
    a display; and
    a processor configured to:
       receive, through the communication interface, at least a portion of a first image and at least a portion of a second image from an external electronic device, wherein the first image is captured by a first camera of the external device, and the second image is captured by a second camera of the external device, the at least a portion of the first image and the at least a portion of the second image include at least one of a view area of interest and a view area of uninterest,
       display the transmitted at least one of the at least a portion of the first image and the at least a portion of the second image,
       receive information on a first object in the view area of interest from another external electronic device,
       generate a second object based on the information on the first object, display the generated second object on the view area of interest, and in response to detecting that a third object in the view area of uninterest is moving at a speed over a predetermined threshold value, automatically transmit an audio data to the external electronic device such that the external electronic device outputs at least one of a name of the third object and information of the third object through at least one speaker.

11. The portable terminal of claim 10, wherein the processor is further configured to:

transmit the at least a portion of the first image and the at least a portion of the second image to the other external electronic device.

12. The portable terminal of claim 10, wherein the processor is further configured to:

receive user input information; and transmit the at least a portion of the first image and the at least a portion of the second image to the other external electronic device, based on the user input information.

* * * * *